United States Patent
Isobe et al.

(10) Patent No.: US 11,459,417 B2
(45) Date of Patent: Oct. 4, 2022

(54) BLOCK COPOLYMER COMPOSITION INCLUDING IONIC GROUP, AND FILM

(71) Applicants: ZEON CORPORATION, Tokyo (JP); NATIONAL UNIVERSITY CORPORATION TOKAI NATIONAL HIGHER EDUCATION AND RESEARCH SYSTEM, Nagoya (JP)

(72) Inventors: Kousuke Isobe, Tokyo (JP); Sadaharu Hashimoto, Tokyo (JP); Atsushi Noro, Nagoya (JP); Takato Kajita, Nagoya (JP); Haruka Tanaka, Nagoya (JP); Yushu Matsushita, Nagoya (JP)

(73) Assignees: ZEON CORPORATION, Tokyo (JP); NATIONAL UNIVERSITY CORPORATION TOKAI NATIONAL HIGHER EDUCATION AND RESEARCH SYSTEM, Nagoya (JP)

( * ) Notice: Subject to any disclaimer, the term of this patent is extended or adjusted under 35 U.S.C. 154(b) by 5 days.

(21) Appl. No.: 17/051,776

(22) PCT Filed: Apr. 25, 2019

(86) PCT No.: PCT/JP2019/017675
§ 371 (c)(1),
(2) Date: Oct. 30, 2020

(87) PCT Pub. No.: WO2019/216241
PCT Pub. Date: Nov. 14, 2019

(65) Prior Publication Data
US 2021/0230336 A1    Jul. 29, 2021

(30) Foreign Application Priority Data

May 7, 2018 (JP) .............................. JP2018-089454

(51) Int. Cl.
| | |
|---|---|
| C08F 287/00 | (2006.01) |
| C08F 8/32 | (2006.01) |
| C08F 8/44 | (2006.01) |
| C08F 8/46 | (2006.01) |
| C08F 210/08 | (2006.01) |
| C08F 210/14 | (2006.01) |
| C08F 212/08 | (2006.01) |
| C08J 5/18 | (2006.01) |

(52) U.S. Cl.
CPC .............. *C08F 287/00* (2013.01); *C08F 8/32* (2013.01); *C08F 8/44* (2013.01); *C08F 8/46* (2013.01); *C08F 210/08* (2013.01); *C08F 210/14* (2013.01); *C08F 212/08* (2013.01); *C08J 5/18* (2013.01); *C08J 2353/02* (2013.01)

(58) Field of Classification Search
CPC .. C08F 287/00; C08F 8/32; C08F 8/44; C08F 8/46; C08F 210/08; C08F 210/14; C08F 212/08; C08J 5/18; C08J 2353/02
See application file for complete search history.

(56) References Cited

U.S. PATENT DOCUMENTS

| | | | | |
|---|---|---|---|---|
| 3,484,417 A | * | 12/1969 | Kalopissis | D06M 15/2735 525/327.5 |
| 4,292,414 A | | 9/1981 | Saito et al. | |
| 4,628,072 A | * | 12/1986 | Shiraki | C08L 77/00 525/78 |
| 5,073,600 A | * | 12/1991 | Gorman | C10M 143/12 525/329.9 |
| 5,206,300 A | * | 4/1993 | Chamberlain | C08F 8/44 525/383 |
| 2010/0190886 A1 | | 7/2010 | Schmitt et al. | |
| 2020/0062948 A1 | | 2/2020 | Isobe et al. | |

FOREIGN PATENT DOCUMENTS

| | | |
|---|---|---|
| EP | 3677645 A1 | 7/2020 |
| JP | S5483091 A | 7/1979 |
| JP | S54146889 A | 11/1979 |
| JP | S5560511 A | 5/1980 |
| JP | S56115307 A | 9/1981 |
| JP | S56116702 A | 9/1981 |
| JP | S56120753 A | 9/1981 |
| JP | S6243411 A | 2/1987 |
| JP | S62181307 A | 8/1987 |
| JP | 2012077158 A | 4/2012 |
| JP | 2016089099 A | 5/2016 |
| WO | 2009013089 A1 | 1/2009 |
| WO | 2018207683 A1 | 11/2018 |
| WO | 2019044660 A1 | 3/2019 |

OTHER PUBLICATIONS

Xie, Journal of Applied Polymer Science, vol. 97, 1248-1253 (2005) (Year: 2004).*
Nov. 10, 2020, International Preliminary Report on Patentability issued in the International Patent Application No. PCT/JP2019/017675.
Jul. 9, 2019, International Search Report issued in the International Patent Application No. PCT/JP2019/017675.

* cited by examiner

*Primary Examiner* — Robert C Boyle
(74) *Attorney, Agent, or Firm* — Kenja IP Law PC

(57) ABSTRACT

The present invention provides a block copolymer composition comprising a block copolymer B formed by introducing a functional group capable of forming a non-covalent bond into a block copolymer A including at least one aromatic vinyl polymer block and at least one conjugated diene polymer block, wherein: the block copolymer B includes an ionic group as the functional group capable of forming a non-covalent bond.

10 Claims, 12 Drawing Sheets

BLOCK COPOLYMER COMPOSITION INCLUDING IONIC GROUP, AND FILM

TECHNICAL FIELD

The present invention relates to a block copolymer composition containing a block copolymer that includes an aromatic vinyl polymer block and a conjugated diene polymer block, in further details, the block copolymer composition which has good elasticity, while having excellent stress relaxation properties.

BACKGROUND ART

A thermoplastic elastomer has been utilized in various fields as a stretchable material since it exhibits rubber elasticity at a normal temperature and the mold fabrication thereof is easy since it is softened and exhibits fluidity when heated.

On the occasion of using the thermoplastic elastomer as a stretchable material in various applications, both of comparatively high elasticity and small tension set are required. Accordingly, various studies have been conducted in order to improve the properties of the thermoplastic elastomer.

For example, some of the inventors of the present invention have reported that, as disclosed in Patent Literature 1, in an elastomer including a block copolymer comprising a hard polymer A which is in glass state at around room temperature and a soft polymer B which is in melt state at around room temperature, when the polymer B includes a polymerization part of a monomer including a functional group capable of forming a non-covalent bond, monomer components non-covalently bond to each other among molecules and in the molecules to form pseudo cross-linking. Accordingly, the elastomer exhibits large breaking extension while exhibiting larger maximum stress and toughness, and thus its elastic limit is large and it exhibits high elasticity.

Meanwhile, the thermoplastic elastomer is also required to have excellent stress relaxation properties. When a force is applied to a material and its deformation occurs, large residual stress is continuously applied to a material, and the material continuously receives works (energy) to cause material fatigue, which results in peel-off and breakage easily. Thus, decreasing the generated pressure so as to minimize the residual stress is important. That is, being excellent in stress relaxation properties, is also required.

Therefore, regarding the thermoplastic elastomer, further improvement has been desired from the viewpoint of achieving elasticity, tension set, and stress relaxation properties in high levels.

CITATION LIST

Patent Literature

Patent Literature 1: Japanese Patent Application Laid-Open (JP-A) No. JP2016-089099

SUMMARY OF INVENTION

Technical Problem

The present invention has been made in view of the above circumstances and a main object thereof is to provide a block copolymer composition which has good elasticity, while having excellent stress relaxation properties and small tension set.

Solution to Problem

The inventors of the present invention conducted a thorough investigation in order to achieve the object described above, and found out that the elasticity, the tension set, and the stress relaxation in high levels are achievable when, among thermoplastic elastomers, a block copolymer containing an aromatic vinyl polymer block and a conjugated diene polymer block particularly high in elasticity and flexibility is used, and a specified functional group capable of forming a non-covalent bond is introduced to that block copolymer. Thereby the present invention has been completed.

Thus, the present invention provides a block copolymer composition comprising a block copolymer B formed by introducing a functional group capable of forming a non-covalent bond into a block copolymer A including at least one aromatic vinyl polymer block and at least one conjugated diene polymer block, wherein: the block copolymer B includes an ionic group as the functional group capable of forming a non-covalent bond.

It is preferable that the ionic group is an ionic group produced by mixing and neutralizing an Arrhenius acid and an Arrhenius base, or/and an ionic group produced by mixing and neutralizing a Broenstead acid and a Broenstead base.

It is preferable that the ionic group comprises a salt of carboxylic acid.

It is preferable that the ionic group is, a group formed by a reaction of, a carboxyl group introduced to the block copolymer A, with a first base, or a group formed by a further reaction of, a carboxyl group formed by a reaction of an acid anhydride group introduced to the block copolymer A with a second base, with a third base, or a group formed by a further reaction of, a carboxyl group formed by hydrolysis of an acid anhydride group introduced to the block copolymer A, with a fourth base.

It is preferable that the acid anhydride group is a group derived from an unsaturated dicarboxylic acid anhydride.

It is preferable that the first base, the third base, and the fourth base are at least one kind selected from the group consisting of an alkali-metal-containing compound and an alkali-earth-metal-containing compound, and the second base is at least one kind selected from the group consisting of ammonia and an amine compound.

The block copolymer B may include a nonionic functional group capable of forming a non-covalent bond as the functional group capable of forming a non-covalent bond, and a molar ratio of the ionic group to the nonionic functional group capable of forming a non-covalent bond in the block copolymer B is preferably in a range of 0.1/100 to 100/0.

The block copolymer B may further comprise a functional group capable of forming a hydrogen bond as the functional group capable of forming a non-covalent bond.

It is preferable that a weight average molecular weight of the aromatic vinyl polymer block is in a range of 3,000 to 50,000, and a vinyl bond content in the conjugated diene polymer block is in a range of 0.1 mol % to 50 mol % and a weight average molecular weight therein is in a range of 10,000 to 500,000.

It is preferable that the aromatic vinyl polymer block is polystyrene.

It is preferable that the conjugated diene polymer block is polybutadiene and/or polyisoprene.

The present invention also provides a film comprising the above described block copolymer composition.

Advantageous Effects of Invention

The present invention exhibits an effect of providing a block copolymer composition which has good elasticity, while having excellent stress relaxation properties and small tension set.

DESCRIPTION OF EMBODIMENTS

Figure 1:
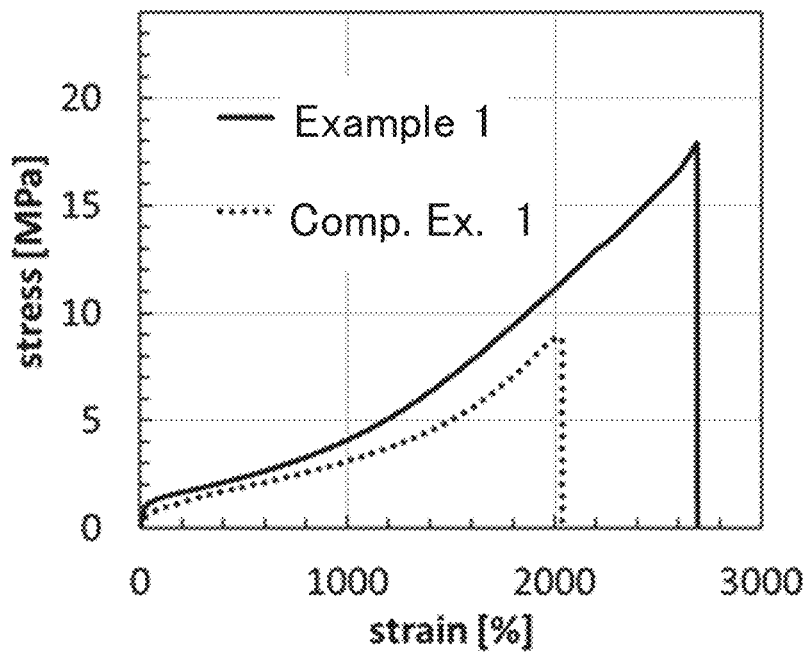
FIG. 1 is a graph showing the tensile test results of Example 1 and Comparative Example 1.

The block copolymer composition including an ionic group and the film using the same of the present invention are hereinafter described in details.

A. Block Copolymer Composition Including Ionic Group

The block copolymer composition including an ionic group of the present invention comprises a block copolymer B formed by introducing a functional group capable of forming a non-covalent bond into a block copolymer A including at least one aromatic vinyl polymer block and at least one conjugated diene polymer block, wherein: the block copolymer B includes an ionic group as the functional group capable of forming a non-covalent bond.

Incidentally, "the block copolymer composition including an ionic group" may be simply referred to as "the block copolymer composition".

According to the present invention, the block copolymer B includes the functional group capable of forming a non-covalent bond and thus a non-covalent bond may be formed between polymer chains using the functional group capable of forming a non-covalent bond to form a pseudo-crosslinking. The non-covalent bond is capable of detachment and recombination, and thus the block copolymer composition of the present invention is capable of achieving different properties from those of conventional block copolymer compositions. The block copolymer composition of the present invention exhibits fluidity at a high temperature since the aromatic vinyl polymer block in the block copolymer melts, but it exhibits elasticity at a room temperature since the aromatic vinyl copolymer block in the block copolymer is vitrified to become a physical crosslinking point. The non-covalent bond formed by the functional group capable of forming a non-covalent bond works as a physical cross-linking point of the aromatic vinyl polymer block in the block copolymer as well as the non-covalent bond cross-linking point, and thus the elasticity of the block copolymer composition may be maintained or improved. Meanwhile, when stress or strain is applied, in principle, the stress may be dispersed as much as the non-covalent bond cross-linking points increase. Also, the stress is relaxed when the functional group capable of forming a non-covalent bond is rearranged, and thereby the physical cross-linking point may be protected. In other words, the physical cross-linking point is maintained even when stress relaxation occurs, and thus the breakage can be inhibited and both the good elasticity and excellent stress relaxation can be achieved. Also, the physical cross-linking point is protected, and thus the tension set can be decreased and both the high elasticity and small tension set can be achieved with a high level of compatibility.

In addition, according to the present invention, the block copolymer B is formed by introducing the functional group capable of forming a non-covalent bond to the block copolymer A, and thus the high elasticity and flexibility of the block copolymer containing an aromatic vinyl polymer block and a conjugated diene polymer block can be maintained. Meanwhile, if one tries to obtain the block copolymer B by copolymerizing a monomer including a functional group capable of forming a non-covalent bond, the copolymerization itself is difficult, and a desired block copolymer, that is a block copolymer with high elasticity and flexibility, may not be obtained.

1. Block Copolymer B

The block copolymer B used in the present invention is formed by introducing a functional group capable of forming a non-covalent bond to a block copolymer A. The block copolymer B is used as a polymer component in the block copolymer composition of the present invention.

Incidentally, in the present descriptions, unless particularly explained otherwise, "the block copolymer" is meant to include all forms of a pure block copolymer, a random block copolymer, and a copolymer having taper block structure.

(1) Block Copolymer A

The block copolymer A includes at least one aromatic vinyl polymer block and at least one conjugated diene polymer block.

(a) Aromatic Vinyl Polymer Block

The aromatic vinyl polymer block included in the block copolymer A is a polymer block containing an aromatic vinyl monomer unit obtained by polymerizing an aromatic vinyl monomer as a main repeating constituent unit.

There are no particular limitations on the aromatic vinyl monomer used in formation of the aromatic vinyl polymer block if it is an aromatic vinyl compound. Examples thereof may include styrene; styrenes having an alkyl group as a substituent such as α-methyl styrene, 2-methyl styrene, 3-methyl styrene, 4-methyl styrene, 2-ethyl styrene, 3-ethyl styrene, 4-ethyl styrene, 2,4-diisopropyl styrene, 2,4-dimethyl styrene, 4-t-butyl styrene, 5-t-butyl-2-methyl styrene; styrenes having an ether group or an ester group as a substituent such as 4-acetoxy styrene, 4-(1-ethoxyethoxy) styrene, 4-methoxy styrene, 4-ethoxy styrene, and 4-t-butoxy styrene; styrenes having a halogen atom as a substituent such as 2-chloro styrene, 3-chloro styrene, 4-chloro styrene, 4-bromo styrene, and 2,4-dibromo styrene; styrenes having an alkyl group and a halogen atom as a substituent such as 2-methyl-4,6-dichloro styrene; and vinyl naphthalene. One kind of these aromatic vinyl monomers may be used singly, or two kinds or more thereof may be used in combination.

Among these, from the viewpoint of commercial availability, styrene, styrenes having an alkyl group with 1 to 12 carbon atoms as a substituent, and styrenes having an ether group or an ester group as a substituent are preferable, and styrene is particularly preferably used. In other words, the aromatic vinyl polymer block is preferably polystyrene.

The aromatic vinyl polymer block may include a monomer unit other than the aromatic vinyl monomer unit as long as the aromatic vinyl monomer unit is a main repeating unit. Examples of the monomer that constitutes the monomer unit other than the aromatic vinyl monomer unit that can be included in an aromatic vinyl polymer block may include, conjugated diene monomers such as 1,3-butadiene and isoprene (2-methyl-1,3-butadiene); α,β-unsaturated nitrile monomers such as acrylonitrile and methacrylonitrile; unsaturated carboxylic acid anhydride monomers such as maleic anhydride, butenyl succinic anhydride, tetrahydro phthalic anhydride, and citraconic acid; unsaturated carboxylic acid ester monomers such as methyl acrylate, ethyl acrylate, 2-ethylhexyl acrylate, methyl methacrylate, ethyl methacrylate, and 2-ethylhexyl methacrylate; and non-conjugated diene monomers preferably with 5 to 12 carbon atoms such as 1,4-pentadiene and 1,4-hexadiene.

Also, when the block copolymer A includes a plurality of the aromatic vinyl polymer block, the plurality of the aromatic vinyl polymer block may be the same and may be different from each other.

The content of the aromatic vinyl monomer unit in the aromatic vinyl polymer block is preferably 60% by mass or more, more preferably 80% by mass or more, and particularly preferably substantially 100% by mass. The aromatic vinyl monomer unit content in the aromatic vinyl polymer block being the above described range allows one to achieve both high elasticity and stress relaxation with a high level of compatibility.

The content of the aromatic vinyl monomer unit in all monomer units of the block copolymer A is not particularly limited, but usually selected in a range of 5% by mass to 90% by mass, and preferably selected in a range of 10% by mass to 60% by mass. When the content of the aromatic vinyl monomer unit in the block copolymer A is in the above described range, the block copolymer composition to be obtained may have both high elasticity and stress relaxation with a high level of compatibility. Incidentally, the content of the aromatic vinyl monomer units in the block copolymer may be measured using $^1$H-NMR.

(b) Conjugated Diene Polymer Block

The conjugated diene polymer block included in the block copolymer A is a polymer block containing a conjugated diene monomer unit obtained by polymerizing a conjugated diene monomer as a main repeating constituent unit.

Incidentally, the content of the conjugated diene monomer unit in all monomer units of the block copolymer A is not particularly limited, but usually selected in a range of 10% by mass to 95% by mass, and preferably selected in a range of 40% by mass to 90% by mass. The measurement method for the content is the same as that for the content of the aromatic vinyl monomer unit.

There are no particular limitations on the conjugated diene monomer used in formation of the conjugated diene monomer block if it is a conjugated diene compound. For example, 1,3-butadiene, isoprene, 2,3-dimethyl-1,3-butadiene, 2-chloro-1,3-butadiene, 1,3-pentadiene, and 1,3-hexadiene may be exemplified. One kind of these conjugated diene monomer may be used singly, or two kinds or more thereof may be used in combination.

Among these, 1,3-butadiene and/or isoprene is/are preferably used. In other words, the conjugated diene polymer block is preferably polybutadiene and/or polyisoprene. When the conjugated diene polymer block is configured by an isoprene unit, the block copolymer composition may have excellent flexibility and stress relaxation.

The conjugated diene polymer block may include a monomer unit other than the conjugated diene monomer unit as long as the conjugated diene monomer unit is a main repeating unit. Examples of the monomer that constitutes the monomer unit other than the conjugated diene monomer unit that can be included in a conjugated diene polymer block, include aromatic vinyl monomers such as styrene and α-methylstyrene; α,β-unsaturated nitrile monomers; unsaturated carboxylic acid anhydride monomers; unsaturated carboxylic acid ester monomers; and non-conjugated diene monomers. Incidentally, specific examples of each monomers may be the same as the monomers constituting the monomer unit other than the aromatic vinyl monomer unit that can be included in the aromatic vinyl polymer block described above.

Also, when the block copolymer A includes a plurality of the conjugated diene polymer block, the plurality of the conjugated diene polymer block may be the same and may be different from each other. In addition, some of the unsaturated bonds of the conjugated diene polymer block may be hydrogenated.

The content of the conjugated diene monomer unit in the conjugated diene polymer block is preferably 50% by mass or more, more preferably 60% by mass or more, further preferably 75% by mass or more, further more preferably 80% by mass or more, and particularly preferably substantially 100% by mass. The content of the conjugated diene monomer unit being the above described range allows one to achieve both high elasticity and stress relaxation with a high level of compatibility.

Also, the vinyl bond content of the conjugated diene polymer block in the block copolymer A (the content of 1,2-vinyl bonds and 3,4-vinyl bonds relative to all conjugated diene monomer units in the conjugated diene polymer block) is not particularly limited, but preferably in a range of 0.1% by mole to 50% by mole, more preferably in a range of 1% by mole to 30% by mole, and particularly preferably in a range of 3% by mole to 10% by mole. If the vinyl bond content is too high, there is a risk that the tension set of the block copolymer composition to be obtained may be large. Incidentally, the vinyl bond content of the conjugated diene polymer block may be measured using $^1$H-NMR.

(c) Block Copolymer A

If the block copolymer A includes at least one aromatic vinyl polymer block and at least one conjugated diene polymer block, the number of each polymer block and their bond forms are not particularly limited.

Specific examples of the form of the block copolymer A may include, when Ar represents an aromatic vinyl polymer block, D represents a conjugated diene polymer block, X represents a single bond or a residue of a coupling agent, and n represents an integer of 2 or more, an aromatic vinyl—conjugated diene block copolymer represented as Ar-D, an aromatic vinyl—conjugated diene—aromatic vinyl block copolymer represented as Ar-D-Ar or (Ar-D)$_n$-X, a conjugated diene—aromatic vinyl—conjugated diene block copolymer represented as D-Ar-D or (D-Ar)$_n$-X, an aromatic vinyl—conjugated diene—aromatic vinyl—conjugated diene block copolymer represented as Ar-D-Ar-D, and a mixture of block copolymers formed by mixing arbitrary combination of two kinds or more of these, but not limited thereto. Among them, as the block copolymer A particularly preferably used in the present invention may be the aromatic vinyl—conjugated diene—aromatic vinyl block copolymer represented as Ar-D-Ar or (Ar-D)$_n$-X.

In the specific example above, as the coupling agent, for example, an alkoxysilane compound including two pieces or more of an alkoxy group that directly bonds to a silicon atom per one molecule may be used. Specific examples of the alkoxysilane compound may include a dialkyldialkoxysilane compound such as dimethyldimethoxysilane, dimethyldiethoxysilane, dimethyldipropoxysilane, dimethyldibutoxysilane, dimethyldiphenoxysilane, diethyldimethoxysilane, diethyldiethoxysilane, diethyldipropoxysilane, diethyldibutoxysilane, and diethyldiphenoxysilane; a monoalkyltrialkoxysilane compound such as methyltrimethoxysilane, methyltriethoxysilane, methyltripropoxysilane, methyltributoxysilane, methyltriphenoxysilane, ethyltrimethoxysilane, ethyltriethoxysilane, ethyltripropoxysilane, ethyltributoxysilane, and ethyltriphenoxysilane; a tetraalkoxysilane compound such as tetramethoxysilane, tetraethoxysilane, tetrapropoxysilane, tetrabutoxysilane, tetraphenoxysilane, and tetratoluyloxysilane; an alkenylalkoxysilane compound such as vinyltrimethoxysilane, vinyltriethoxysilane, vinyltripropoxysilane, vinyltributoxysilane, vinyltriphenoxysilane, allyltrimethoxysilane, octenyltrimethoxysilane, divinyldimethoxysilane, and styryltrimethoxysilane; an arylalkoxysilane compound such as phenyltrimethoxysilane, phenyltriethoxysilane, phenyltripropoxysilane, phenyltributoxysilane, and phenyltriphenoxysilane; a halogenoalkoxysilane compound such as trimethoxychlorosilane, triethoxychlorosilane, tripropoxychlorosilane, tributoxychlorosilane, triphenoxychlorosilane, dimethoxydichlorosilane, dipropoxydichlorosilane, diphenoxydichlorosilane, methoxytrichlorosilane, ethoxytrichlorosilane, propoxytrichlorosilane, phenoxytrichlorosilane, trimethoxybromosilane, triethoxybromosilane, tripropoxybromosilane, triphenoxybromosilane, dimethoxydibromosilane, diethoxydibromosilane, diphenoxydibromosilane, methoxytribromosilane, ethoxytribromosilane, propoxytribromosilane, phenoxytribromosilane, trimethoxyiodosilane, triethoxyiodosilane, tripropoxyiodosilane, triphenoxyiodosilane, dimethoxydiiodosilane, diethoxydiiodosilane, dipropoxyiodosilane, methoxytriiodosilane, ethoxytriiodosilane, propoxytriiodosilane, and phenoxytriiodosilane; a halogenoalkylalkoxysilane compound such as β-chloroethylmethyldimethoxysilane and γ-chloropropylmethyldimethoxysilane; hexamethoxydisilane, hexaethoxydisilane, bis(trimethoxysilyl)methane, bis(triethoxysilyl)methane, bis(trimethoxysilyl)ethane, bis(triethoxysilyl)ethane, bis(trimethoxysilyl)propane, bis(triethoxysilyl)propane, bis(trimethoxysilyl)butane, bis(triethoxysilyl)butane, bis(trimethoxysilyl)heptane, bis(triethoxysilyl)heptane, bis(trimethoxysilyl)hexane, bis(triethoxysilyl)hexane, bis(trimethoxysilyl)benzene, bis(triethoxysilyl)benzene, bis(trimethoxysilyl)benzene, bis(trimethoxysilyl)cyclohexane, bis(triethoxysilyl)cyclohexane, bis(triethoxysilyl)benzene, and bis(3-triethoxysilylpropyl)ethane.

Among these, an alkoxysilane compound, of which functional group reacting with the active terminal of a polymer is just alkoxysilane, is preferably used. In specific, a dialkyldialkoxysilane compound, a monoalkyltrialkoxysilane compound, or a tetraalkoxysilane compound is more preferably used, and the tetraalkoxysilane compound is particularly preferably used. Such an alkoxysilane compound is used as the coupling agent, and thus both high elasticity and small tension set with a high level of compatibility can be achieved.

Also, as the coupling agent, for example, bifunctional halogenated silane such as dichlorosilane, monomethyldichlorosilane, and dimethyldichlorosilane; bifunctional halogenated alkane such as dichloroethane, dibromoethane, methylene chloride, and dibromomethane; and bifunctional halogenated tin such as dichlorotin, monomethyldichlorotin, dimethyldichlorotin, monoethyldichlorotin, diethyldichlorotin, monobutyldichlorotin, and dibutyldichlorotin; may be used.

One kind of these coupling agent may be used singly, and two kinds or more thereof may be used in combination.

The weight average molecular weight of the block copolymer A is not particularly limited, and usually 30,000 to 500,000, preferably 60,000 to 470,000, and more preferably 90,000 to 450,000.

Also, there are no particular limitations on the weight average molecular weight of each polymer block in the block copolymer A. The weight average molecular weight of the aromatic vinyl polymer block is preferably in a range of 3,000 to 50,000, and more preferably in a range of 6,000 to 20,000. Also, the weight average molecular weight of the conjugated diene polymer block is preferably in a range of 10,000 to 500,000, and more preferably in a range of 40,000 to 400,000. When the weight average molecular weight of the conjugated diene polymer block is in the above described range, the block copolymer composition to be obtained may have both high elasticity and stress relaxation with a high level of compatibility.

The molecular weight distribution that is expressed as the ratio (Mw/Mn) between the weight average molecular weight (Mw) and the number average molecular weight (Mn) of each polymer block constituting the block copolymer A and the block copolymer A is not particularly limited, but the molecular weight distribution is, in each case, usually 1.8 or less, preferably 1.3 or less, and more preferably 1.1 or less. When the molecular weight distribution of the block copolymer A and each polymer block constituting the block copolymer A is in the above described range, the block copolymer composition to be obtained may have both high elasticity and stress relaxation with a high level of compatibility.

Incidentally, the weight average molecular weight (Mw) and the number average molecular weight (Mn) of the block copolymer composition are determined as a value measured by high performance liquid chromatography using tetrahydrofuran (THF) as a solvent, and calculated relative to polystyrene standards.

The melt index the block copolymer A is not particularly limited, but, as a value measured based on ASTM D-1238 (G condition, 200° C., 5 kg), it is usually 1 to 1000 g/10 minutes, preferably 3 to 700 g/10 minutes, and more preferably 5 to 500 g/10 minutes.

The block copolymer A can be produced in accordance with a conventional method. Incidentally, the method for producing the block copolymer A is described later.

Also, in the present invention, a commercially available block copolymer can be used as the block copolymer A. For examples, products such as For example, products such as "Quintac (registered trademark)" (from ZEON Corporation), "JSR-SIS (registered trademark)" (from JSR Corporation), "Vector (registered trademark)" (from DEXCO Polymers), "Asaprene (registered trademark)", "Tufprene (registered trademark)", and "Tuftec (registered trademark)" (from Asahi Kasei Corporation), "Septon (registered trademark)" (from KURARAY CO., LTD), and "Kraton (registered trademark)" (from Kraton JSR Elastomers) may be used.

(2) Functional Group Capable of Forming Non-Covalent Bond

Examples of the non-covalent bond may include a hydrogen bond, a coordinate bond, and an ionic bond.

The block copolymer B includes an ionic group as the functional group capable of forming a non-covalent bond.

Here, the "ionic group" is a functional group in which an ionic interaction can occur, which signifies a functional group capable of forming an ionic bond.

Since the bonding strength of the ionic interaction is strong among the non-covalent bonds, when the block copolymer B includes the ionic group as the functional group capable of forming a non-covalent bond, the effect of the functional group capable of forming a non-covalent bond may be improved. In other words, as described above, the non-covalent bond formed by the functional group capable of forming a non-covalent bond works as a non-covalent cross-linking point to improve the elasticity, the tension set, and the stress relaxation of the block copolymer composition. When the functional group capable of forming a non-covalent bond is the ionic group, the elasticity of the block copolymer composition may be effectively improved, the tension set may be further decreased, and the stress relaxation may be further improved since the bonding strength of the ionic interaction is strong. Therefore, high elasticity, small tension set, and excellent stress relaxation can be achieved with high level of compatibility.

Furthermore, in the case of the ionic group, the effect of the functional group capable of forming a non-covalent bond can be improved, and thus sufficient effect can be obtained even when the introduction rate of the ionic group is relatively small. Thus, the block copolymer B including the ionic group can be easily obtained.

The ionic group is preferably an ionic group produced by mixing and neutralizing an Arrhenius acid and an Arrhenius base, or/and an ionic group produced by mixing and neutralizing a Broenstead acid and a Broenstead base. The reason therefor is that the introduction of these ionic groups to the block copolymer A is easy.

Specific examples of such an ionic group may include an ionic group comprising a salt of carboxylic acid, an ionic group comprising a salt of phosphoric acid, an ionic group comprising a salt of sulfonic acid, and an ionic group comprising a salt of anion produced by removing proton from a hydroxy group in alcohol. Examples of the salts of carboxylic acid, phosphoric acid, and sulfonic acid may include an alkali metal salt, an alkali earth metal salt, an ammonium salt, a pyridinium salt, and an imidazolium salt.

Among them, it is preferable that the ionic group comprises the salt of carboxylic acid. The reason therefor is that the introduction of the ionic group comprising the salt of carboxylic acid to the block copolymer A is easy. As the salt of carboxylic acid, above all, an alkali metal salt such as a sodium salt, a lithium salt, and a potassium salt, and an alkali earth metal salt such as a magnesium salt, a calcium salt, and a barium salt are preferable.

Also, the block copolymer B may further include a nonionic functional group capable of forming a non-covalent bond as the functional group capable of forming a non-covalent bond. In the case of the nonionic functional group capable of forming a non-covalent bond, examples of the non-covalent bond may include a hydrogen bond and a coordinate bond.

Examples of the nonionic functional group capable of forming a non-covalent bond may include an amide group, an imide group, a urethane bond, a carboxyl group, and a hydroxyl group.

The nonionic functional group capable of forming a non-covalent bond is, above all, preferably a functional group capable of forming a hydrogen bond. It means that the block copolymer B ma include the ionic group and the functional group capable of forming a hydrogen bond, as the functional group capable of forming a non-covalent bond. The reason therefor is that the association level per one bond of the hydrogen bond is reasonable (which means the bonding strength is weak or the relaxation time is short), and rearrangement is possible.

The functional group capable of forming a hydrogen bond is preferably at least one kind selected from the group consisting of an amide group, an imide group, a urethane bond, a carboxyl group, and a hydroxy group.

The block copolymer B includes the group capable of forming a non-covalent bond, and the functional group capable of forming a non-covalent bond may, for example, bond directly to the block copolymer, and may bond thereto interposing a linking group.

The block copolymer B is formed by introducing the functional group capable of forming a non-covalent bond to the block copolymer A. The method for introducing the functional group capable of forming a non-covalent bond may be a method with which the functional group capable of forming a non-covalent bond can be introduced to the block copolymer A, and examples of the method may include a modification method by a modifier, and a method using the functional group transformation of alkene. Among them, the modification method by a modifier is preferable. It means that the functional group capable of forming a non-covalent bond preferably include a residue of the modifier.

Also, when the modification method by a modifier is used, the functional group capable of forming a non-covalent bond may be introduced by the modification with a modifier, and the functional group capable of forming a non-covalent bond may be introduced by further reaction after the modification with a modifier.

Incidentally, the "residue of the modifier" refers to a part derived from the modifier in a reaction product generated when the modifier reacts with the block copolymer A, or in a reaction product generated when the modifier reacts with the block copolymer A and further reacts with an additional compound.

Examples of the modifier may include an acid modifier. Also, as the acid modifier, an Arrhenius acid and/or a Broenstead acid may be used. Examples thereof may include an unsaturated carboxylic acid, an unsaturated dicarboxylic acid anhydride, an unsaturated phosphoric acid and acid anhydride thereof, and an unsaturated sulfonic acid and acid anhydride thereof. Among them, the unsaturated dicarboxylic acid anhydride is preferable in views of the easiness of reaction and economical efficiency. Incidentally, the unsaturated carboxylic acid and the unsaturated dicarboxylic acid anhydride are described later.

When the acid modifier is the unsaturated dicarboxylic acid anhydride, an acid anhydride group derived from the unsaturated dicarboxylic acid anhydride is introduced to the block copolymer A. When the acid modifier is the unsaturated dicarboxylic acid anhydride, the acid anhydride group may be substituted with the ionic group by further reaction after the modification with the acid modifier. Also, in this case, the acid anhydride group may be substituted with the nonionic functional group capable of forming a non-covalent bond by further reaction after the modification with the acid modifier, and the nonionic functional group capable of forming a non-covalent bond may be substituted with the ionic group by furthermore reaction. In specific, the acid anhydride group may be brought into reaction with a base by a base treatment to transform the acid anhydride group to an amide group and a carboxyl group, and the carboxyl group is brought into reaction with a base by a further base treatment to transform the carboxyl group to a salt of carboxylic acid. Also, the acid anhydride group may be transformed to a carboxyl group by hydrolysis of the acid anhydride group, and the carboxyl group is brought into reaction with a base by a furthermore base treatment to transform the carboxyl group to a slat of carboxylic acid.

Above all, the method for introducing the functional group capable of forming a non-covalent bond is preferably a method of introducing the functional group capable of forming a non-covalent bond by a further base treatment after the modification with the acid modifier. In other words, it is preferable that the block copolymer B is produced by an acid modification of the block copolymer A to form a modified block copolymer C, and by a further base treatment to the modified block copolymer C. In other words, the functional group capable of forming a non-covalent bond is preferably a group formed by a reaction of, an acid group derived from the acid modifier introduced to the block copolymer A, with a base. In particular, the ionic group is preferably a group formed by a reaction of, an acid group derived from the Arrhenius acid introduced to the block copolymer A, with an Arrhenius base, and/or a group formed by a reaction of, an acid group derived from Broenstead acid introduced to the block copolymer A, with a Broenstead base.

The acid group is an acid group derived from the acid modifier, which means the acid group derived from the Arrhenius acid and/or the Broenstead acid, and examples thereof may include a carboxyl group, a phosphoric acid group, and a sulfo group. Also, as the base, an Arrhenius base and/or a Broenstead base may be used, and examples thereof may include a metal-containing compound, ammonium, an amine compound, pyridine, and imidazole.

In specific, it is preferable that the ionic group is a group formed by a reaction of, a carboxyl group introduced to the block copolymer A, with a first base, or a group formed by a further reaction of, a carboxyl group formed by a reaction of an acid anhydride group introduced to the block copolymer A with a second base, with a third base, or a group formed by a further reaction of, a carboxyl group formed by hydrolysis of an acid anhydride group introduced to the block copolymer A, with a fourth base. In particular, it is preferable that the ionic group is the group formed by a further reaction of, a carboxyl group formed by a reaction of an acid anhydride group introduced to the block copolymer A with a second base, with a third base. In this case, the block copolymer B may include the ionic group and the nonionic functional group capable of forming a non-covalent bond as the functional group capable of forming a non-covalent bond, and may particularly include the ionic group and the functional group capable of forming a hydrogen bond.

Incidentally, the method for introducing such a functional group capable of forming a non-covalent bond is described later.

Also, when the ionic group is the group formed by a reaction of, a carboxyl group introduced to the block copolymer A, with a first base, the carboxyl group introduced to the block copolymer A is to react with the first base at least partially; the carboxyl group may react with the first base partially, and the carboxyl group may react with the first base entirely. It means that the block copolymer B may include both of the group formed by a reaction of, a carboxyl group introduced to the block copolymer A, with a first base, and the carboxyl group introduced to the block copolymer A.

Also, when the ionic group is the group formed by a further reaction of, a carboxyl group formed by a reaction of an acid anhydride group introduced to the block copolymer A with a second base, with a third base, the acid anhydride group introduced to the block copolymer A reacts with the second base at least partially; the acid anhydride group may react with the second base partially, and the acid anhydride group may react with the second base entirely. In the same manner, the carboxyl group, formed by a reaction of the acid anhydride group introduced to the block copolymer A with the second base, reacts with the third base at least partially; the carboxyl group may react with the third base partially, and the carboxyl group may react with the third base entirely. It means that the block copolymer B may include, for example, the group formed by a further reaction of, a carboxyl group formed by a reaction of an acid anhydride group introduced to the block copolymer A with a second base, with a third base, the acid anhydride group introduced to the block copolymer A, and the group formed by a reaction of the acid anhydride group introduced to the block copolymer A with the second base.

Also, when the ionic group is the group formed by a further reaction of, a carboxyl group formed by hydrolysis of an acid anhydride group introduced to the block copolymer A, with a fourth base, the acid anhydride group introduced to the block copolymer A is hydrolyzed at least partially; the acid anhydride group may be hydrolyzed partially, and the acid anhydride group may be hydrolyzed entirely. In the same manner, the carboxyl group formed by hydrolysis of an acid anhydride group introduced to the block copolymer A reacts with the fourth base at least partially; the carboxyl group may react with the fourth base partially, and the carboxyl group may react with the fourth base entirely. It means that the block copolymer B may include, for example, the group formed by a further reaction of, a carboxyl group formed by hydrolysis of an acid anhydride group introduced to the block copolymer A, with a fourth base, the acid anhydride group introduced to the block copolymer A, and the group formed by a hydrolysis of an acid anhydride group introduced to the block copolymer A.

Specific examples of the group formed by the reaction of the carboxyl group with the first base, the third base, or the fourth base, may include a salt of carboxylic acid.

Specific examples of the group formed by the reaction of the acid anhydride group with the second base may include an amide group and a carboxyl group.

Specific examples of the group formed by the hydrolysis of the acid anhydride group may include a carboxyl group.

As described above, the functional group capable of forming a non-covalent bond preferably includes the residue of an acid modifier, specifically preferably include the residue of materials such as unsaturated carboxylic acid, unsaturated dicarboxylic acid anhydride, unsaturated phosphoric acid or acid anhydride thereof, and unsaturated sulfonic acid or acid anhydride thereof, and particularly preferably include the residue of unsaturated dicarboxylic acid anhydride.

Examples of the unsaturated carboxylic acid may include ethylenyl unsaturated carboxylic acid having 8 or less carbon atoms such as an acrylic acid, a methacrylic acid, a crotonic acid, a maleic acid, a fumaric acid, an itaconic acid, and a citraconic acid; and a Diels-Alder addition product of, a conjugated diene such as 3,6-endomethylene-1,2,3,6-tetrahydrofutaric acid, and an $\alpha,\beta$-unsaturated dicarboxylic acid having 8 or less carbon atoms.

Examples of the unsaturated dicarboxylic acid anhydride may include an $\alpha,\beta$-unsaturated dicarboxylic acid anhydride having 8 or less carbon atoms such as a maleic anhydride, an itaconic acid anhydride, and a citraconic anhydride; and a Diels-Alder addition product of, a conjugated diene like 3,6-endomethlene-1,2,3,6-tetrahydrophthalic acid anhydride, and an $\alpha,\beta$-unsaturated dicarboxylic acid anhydrides having 8 or less carbon atoms.

In views of the easiness of reaction and economical efficiency, the unsaturated dicarboxylic acid anhydride is preferable, the $\alpha,\beta$-unsaturated dicarboxylic acid anhydride having 8 or less carbon atoms is more preferable, and the maleic anhydride is particularly preferable.

The functional group capable of forming a non-covalent bond may include one kind or two kinds or more of the residue of the acid modifier.

Also, the first base, the third base, and the fourth base may be the one that can generate the ionic group by reacting with a carboxyl group. An Arrhenius base and/or a Broenstead base may be used, and examples thereof may include a metal-containing compound, ammonia, an amine compound, pyridine, and imidazole.

Above all, the first base, the third base, and the fourth base are preferably at least one kind selected from the group consisting of an alkali-metal-containing compound and an alkali-earth-metal-containing compound. This is to stably generate the ionic group. Examples of the alkali-metal-containing compound may include an alkoxide, an oxide, a hydroxide, a carbonate, a hydrogen carbonate, an acetate, a sulfate, and a phosphate of an alkali metal such as sodium, lithium, and potassium. Examples of the alkali-earth-metal-containing compound may include an alkoxide, an oxide, a hydroxide, a carbonate, a hydrogen carbonate, an acetate, a sulfate, and a phosphate of an alkali earth metal such as magnesium, calcium, and barium.

Also, the second base may be the one that can generate a carboxyl group by reacting with an acid anhydride group, and examples thereof may include at least one kind selected from the group consisting of ammonia and an amine compound. The amine compound may be either one of a primary amine and a secondary amine. Also, the amine compound may be monoamine and may be diamine, but monoamine is preferably used since it is easily available. Examples of the amine compound may include an aliphatic amine, an aromatic amine, an alicyclic amine, and a heterocyclic amine.

Among them, the aliphatic amine is preferable, and in particular, an alkylamine having 1 to 12 carbon atoms is preferable, and an alkylamine having 2, 4 or 6 carbon atoms is more preferable.

Above all, the second base is preferably at least one kind selected from the group consisting of an ammonia, a primary amine compound, and a secondary amine compound. The reason therefor is that these can generate an amide group by reacting with the acid anhydride group.

In particular, the ionic group is preferably the group formed by a further reaction of, a carboxyl group formed by a reaction of an acid anhydride group introduced to the block copolymer A with a second base, with a third base. The reason therefor is that the reaction of the acid anhydride group and the amine compound generates the carboxyl group and the amide group, and the reaction of the carboxyl group and the third base generates the salt of carboxylic acid. In other words, thereby the block copolymer B may include, as the functional group capable of forming a non-covalent bond, the salt of carboxylic acid that is the ionic group, and the amide group that is the nonionic functional group capable of forming a non-covalent bond as well as the functional group capable of forming a hydrogen bond.

The introduction rate of the functional group capable of forming a non-covalent bond to the block copolymer B may be in a range the effect of the present invention can be obtained. For example, relative to 100% by mole of the conjugated diene monomer unit in the block copolymer B, it is preferably 0.1% by mole to 25% by mole, and more preferably 0.5% by mole to 15% by mole. If the introduction rate of the functional group capable of forming a non-covalent bond is too high, a lot of non-covalent bonds (non-covalent bond cross-linking points) are formed, stress would concentrate on the physical cross-linking points before the rearrangement of the functional group capable of forming a non-covalent bond occurs, and breakage easily occurs.

Incidentally, the introduction rate of the functional group capable of forming a non-covalent bond signifies the proportion of the conjugated diene monomer unit to which the functional group capable of forming a non-covalent bond is introduced, relative to all the conjugated diene monomer units in the block copolymer B. The introduction rate of the functional group capable of forming a non-covalent bond may be calculated using $^1$H-NMR. Also, if the functional group capable of forming a non-covalent bond is introduced may be confirmed by $^1$H-NMR and/or an infrared spectroscopic analysis.

Also, a molar ratio of the ionic group to the nonionic functional group capable of forming a non-covalent bond in the block copolymer B (ionic group/nonionic functional group capable of forming a non-covalent bond) is preferably in a range of 0.1/100 to 100/0, and more preferably in a range of 1/99 to 100/0. Even when the molar ratio is small, sufficient effect may be obtained by increasing the introduction rate of the functional group capable of forming a non-covalent bond.

Incidentally, the molar ratio may be calculated using $^1$H-NMR and/or an infrared spectroscopic analysis.

2. Additional Polymer

The block copolymer composition of the present invention may include just the block copolymer B as the polymer component, but may include an additional polymer component.

The block copolymer composition of the present invention may, other than the block copolymer B, for example, include a block copolymer A. In other words, when the block copolymer composition of the present invention comprises two kinds or more of the block copolymer including at least one aromatic vinyl polymer block and at least one conjugated diene block, at least one kind of the block copolymers includes the functional group capable of forming a non-covalent bond.

Also, as the polymer component other than the block copolymer B that can be included in the block copolymer composition of the present invention, other than the block copolymer A, an aromatic vinyl—conjugated diene—aromatic vinyl block copolymer other than the block copolymer A and the block copolymer B, an aromatic vinyl—conjugated diene block copolymer, an aromatic vinyl homopolymer, a conjugated diene homopolymer, an aromatic vinyl—conjugated diene random copolymer, and branch-type polymers of these; a thermoplastic elastomer such as a polyurethane-based thermoplastic elastomer, a polyamide-based thermoplastic elastomer, and a polyester-based thermoplastic elastomer; and a thermoplastic resin such as polyethylene, polypropylene, polyvinylchloride, an acrylonitrile-styrene copolymer, an acrylonitrile-butadiene-styrene copolymer, and polyphenylene ether; may be exemplified.

However, an aromatic vinyl polymer and a polyolefin-based thermoplastic resin described in the section "B. Film" later are distinguished from the polymer components constituting this block copolymer composition.

The content of these additional polymers in the block copolymer composition is preferably less than 50% by mass, and more preferably 20% by mass or less.

3. Method for Producing Block Copolymer Composition

As a method for producing the block copolymer composition of the present invention, a suitable method is a method comprising: a step of obtaining a block copolymer C to which an acid group derived from an acid modifier is introduced via a reaction of a block copolymer A with an acid modifier; and a step of conducting a base treatment to the modified block copolymer C to obtain a block copolymer B to which a functional group capable of forming a non-covalent bond is introduced.

Hereinafter, the case of using an unsaturated carboxylic acid or an unsaturated dicarboxylic acid anhydride as the acid modifier is explained by way of examples.

In the case of using an unsaturated carboxylic acid as the acid modifier, the method for producing the block copolymer composition of the present invention comprises a first step of obtaining a modified block copolymer C1 to which a carboxyl group is introduced via a reaction of a block copolymer A with an unsaturated carboxylic acid, and a second step of conducting a base treatment to the modified block copolymer C1 to obtain a block copolymer B to which a functional group capable of forming a non-covalent bond as well as an ionic group is introduced.

Also, in the case of using an unsaturated dicarboxylic acid anhydride as the acid modifier, the method for producing the block copolymer composition of the present invention is suitably a method comprising: a third step of obtaining a modified block copolymer C2 to which an acid anhydride group is introduced via a reaction of a block copolymer A with an unsaturated dicarboxylic acid anhydride; a fourth step of conducting a base treatment or a hydrolysis treatment to the modified block copolymer C2 to obtain a modified block copolymer C3 to which a carboxyl group is introduced; and a fifth step of conducting a base treatment to the modified block copolymer C3 to obtain a block copolymer B to which a functional group capable of forming a non-covalent bond as well as an ionic group is introduced.

Hereinafter, the production method in each embodiment is explained.

(1) First Embodiment (Case of Using Unsaturated Carboxylic Acid as Acid Modifier)

(a) Blok Copolymer A

The block copolymer A used in the first step is as described above.

The block copolymer A can be produced in accordance with a conventional method. Polymerizations such as a radical living polymerization, a cation living polymerization, and a ring-opening metathesis polymerization may be used, but the most general production method may be a method of forming a polymer block by respectively polymerizing an aromatic vinyl monomer and a conjugated diene monomer in sequence using an anion living polymerization method, and then conducting a coupling via a reaction with a coupling agent as required.

Also, when the block copolymer A is a mixture of two kinds or more of a block copolymer, there are no particular limitations on the method for obtaining the mixture of the block copolymers, and it may be produced in accordance with a conventional method for producing a block copolymer. For example, the mixture may be produced in a manner such that two kinds or more of the block copolymer are respectively produced separately, an additional polymer component and various additives are blended therewith as required, and then mixed in accordance with a conventional method such as kneading and solution mixing.

Also, the method for obtaining the mixture of the block copolymers may be, for example, a method in which an aromatic vinyl—conjugated diene block copolymer a is obtained and then the terminal of a part of the aromatic vinyl—conjugated diene block copolymer a is bonded to an aromatic vinyl polymer block to obtain an aromatic vinyl—conjugated diene—aromatic vinyl block copolymer b, that is a method of preparing the two kinds of the block copolymers at the same time. In specific, Patent Literatures such as WO2009/123089 and JP-A No. 2012-077158 may be used as references.

In addition, the obtained mixture of the block copolymers may be processed in a shape such as pellet in accordance with a conventional method, and then used for application.

Further, as described above, a commercially available block copolymer can be also used as the block copolymer A.

(b) First Step

In the first step, the block copolymer A is brought to a reaction with an unsaturated carboxylic acid to obtain a modified block copolymer C1 to which a carboxyl group is introduced. In other words, an acid modification of the block copolymer A is conducted by the unsaturated carboxylic acid to obtain the modified block copolymer C1. Incidentally, the acid modification may be conducted once or multiple of times. Also, in the case of conducting the acid modification multiple of times, the conditions for the acid modification may be the same or different in each time.

The unsaturated carboxylic acid used as the acid modifier in the acid modification is as described above. The unsaturated carboxylic acid may be used singly, or two kinds or more thereof may be used in combination.

The amount of use of the unsaturated carboxylic acid relative to 100 parts by mass of the block copolymer A is usually 0.01 to 200 parts by mass, and preferably 0.05 to 100 parts by mass.

The reaction temperature of the acid modification reaction may be usually in a range of 50 to 300° C. If the reaction temperature is too low, reaction efficiency may be inferior and there is a risk that the content of unreacted unsaturated carboxylic acid in the modified block copolymer C1 may increase. Also, the reaction time may be usually in a range of 5 minutes to 20 hours. If the reaction time is too short, reaction efficiency may be inferior and there is a risk that the content of unreacted unsaturated carboxylic acid in the modified block copolymer C1 may increase.

Also, as required, materials such as a diluent, an antigelling agent, and a reaction accelerator may be present on the occasion of the acid modification reaction.

The acid value of the modified block copolymer C1 is preferably 1.3 to 1050 KOHmg/g, and above all, preferably 6.5 to 700 KOHmg/g. If the acid value is too low or the acid value is too high, there may be cases where the intended elasticity and stress relaxation for the block copolymer composition may not be obtained.

Incidentally, the acid value may be, for example, a value measured for the modified block copolymer C1 according to JIS K 0070.

The introduction rate of the carboxyl group to the modified block copolymer C1 with respect to 100% by mole of the conjugated diene monomer unit in the modified block copolymer C1 may be, for example, 0.1% by mole to 50% by mole, and is preferably 0.5% by mole to 25% by mole. If the introduction rate of the carboxyl group is too low or too high, there may be cases where the intended elasticity and stress relaxation for the block copolymer composition may not be obtained. Incidentally, the introduction rate of the carboxyl group signifies the proportion of the conjugated diene monomer unit to which the carboxyl group relative to all the conjugated diene monomer units in the block copolymer B. The introduction rate of the carboxyl group may be calculated using $^1$H-NMR. Also, if the carboxyl group is introduced may be confirmed by $^1$H-NMR and/or an infrared spectroscopic analysis.

After the acid modification reaction, unreacted unsaturated carboxylic acid is preferably removed.

(c) Second Step

In the second step, a base treatment is conducted to the modified block copolymer C1 to obtain a block copolymer B to which a functional group capable of forming a non-covalent bond as well an ionic group is introduced. Incidentally, the base treatment may be conducted once or multiple of times. Also, in the case of conducting the base treatment multiple of times, the conditions for the base treatment may be the same or different in each time.

The first base used in the base treatment is as described above. The first base may be used singly, or two kinds or more thereof may be used in combination.

In the base treatment, the carboxyl group introduced to the modified block copolymer C1 is neutralized by the first base to form a salt of carboxylic acid.

The amount of use of the first base relative to the carboxyl group introduced to the modified block copolymer C may be, for example, equimolar or less, and specifically approximately 0.01 to 1 time by mole.

The base treatment may be conducted without solvent, and may be conducted in a solvent. In the case of conducting the base treatment in a solvent, examples of the solvent may include alcohol; aliphatic halogenated hydrocarbon having 1 to 2 carbon atoms such as 1,2-dichloroethane, chloroform, dichloromethane, and 1,1-dichloroethane; aliphatic cyclic hydrocarbon such as cyclohexane, methylcyclohexane, and cyclopentane; nitromethane, nitrobenzene, acetonitrile, tetrahydrofuran, tetrahydropyran, 1,2-dimethoxyethane, acetone, methylethylketone, dimethylsulfoxide, dimethylformamide, pyrrolidone, and water. The solvent may be used singly, or two kinds or more thereof may be used in combination.

The reaction temperature of the base treatment varies with the kind of the carboxyl group introduced to the modified block copolymer C1 and the kind of the first base, but for example, may be 0 to 200° C., and is preferably 10 to 150° C. If the reaction temperature is too low, reaction speed may be slow, and if the reaction temperature is too high, there is a risk that the modified block copolymer C1 may be pyrolytically decomposed. Also, the reaction time varies with the reaction temperature, but for example, may be 1 minute to 40 hours, and preferably 3 minutes to 2 hours. If the reaction time is too short, the reaction may not sufficiently proceed, and if the reaction time is too long, there is a risk that the reaction efficiency may be inferior.

After the base treatment, remaining of the first base is preferably removed. Removing method may be appropriately selected depending on the kinds of the base treatment and the first base, and examples of the method may include washing, neutralizing, filtrating, and drying.

The functional group capable of forming a non-covalent bond and the introduction rate thereof are as described above.

(2) Second Embodiment (Case of Using Unsaturated Dicarboxylic Acid Anhydride as Acid Modifier)

(a) Block Copolymer A

The block copolymer A may be the same as that in the first embodiment above.

(b) Third Step

In the third step, the block copolymer A is brought to react with an unsaturated dicarboxylic acid anhydride to obtain a modified block copolymer C2 to which an acid anhydride group is introduced. In other words, the modified block copolymer C2 is obtained via an acid modification of the block copolymer A with an unsaturated dicarboxylic acid anhydride. Incidentally, the acid modification may be conducted once or multiple of times. Also, in the case of conducting the acid modification multiple of times, the conditions for the acid modification may be the same or different in each time.

The unsaturated dicarboxylic acid anhydride used as the acid modifier in the acid modification reaction is as described above. The unsaturated dicarboxylic acid anhydride may be used singly, or two kinds or more thereof may be used in combination.

The amount of use of the unsaturated dicarboxylic acid anhydride relative to 100 parts by mass of the block copolymer A is usually 0.01 to 200 parts by mass, and preferably 0.05 to 100 parts by mass.

The acid modification reaction may be the same as that of the first step in the first embodiment.

The acid value of the modified block copolymer C2 may be the same as that of the modified block copolymer C1 in the first embodiment.

The introduction rate of the acid anhydride group in the modified block copolymer C2 relative to 100% by mole of the conjugated diene monomer unit in the modified block copolymer C2 may be, for example, 0.1% by mole to 50% by mole, and is preferably 0.5% by mole to 25% by mole. If the introduction rate of the acid anhydride group is too low or too high, there may be cases where the intended elasticity and stress relaxation for the block copolymer composition may not be obtained. Incidentally, the introduction rate of the acid anhydride group signifies the proportion of the conjugated diene monomer unit to which the acid anhydride group is introduced relative to all the conjugated diene monomer units in the block copolymer B. The introduction rate of the acid anhydride group may be calculated using $^1$H-NMR. Also, if the acid anhydride group is introduced may be confirmed by $^1$H-NMR and/or an infrared spectroscopic analysis.

After the acid modification reaction, unreacted unsaturated dicarboxylic acid anhydride is preferably removed.

(c) Fourth Step

In the fourth step, a base treatment or a hydrolysis treatment is conducted to the modified block copolymer C2 to obtain a modified block copolymer C3 to which a carboxyl group is introduced. Incidentally, the base treatment may be conducted once or multiple of times. Also, in the case of conducting the base treatment multiple of times, the conditions for the base treatment may be the same or different in each time.

The second base used in the base treatment is as described above. The second base may be used singly, or two kinds or more thereof may be used in combination.

In the base treatment, the acid anhydride group is brought to react with the second base to form an amide group and a carboxyl group. In other words, in this case, in the base treatment, the modified block copolymer C2 may be modified with an amine.

The amount of use of the second base is appropriately selected in accordance with the kind of the base treatment. For example, in the case of conducting the modification with an amine, the amount of use of the second base relative to the acid anhydride group introduced to the modified block copolymer C2 may be equimolar or less, and specifically approximately 0.01 to 1 time by mole.

The base treatment may be conducted without a solvent, and may be conducted in a solvent. In the case of conducting the base treatment in a solvent, examples of the solvent may include aliphatic halogenated hydrocarbon having 1 to 2 carbon atoms such as 1,2-dichloroethane, chloroform, dichloromethane, and 1,1-dichloroethane; aliphatic cyclic hydrocarbon such as cyclohexane, methylcyclohexane, and cyclopentane; nitromethane, nitrobenzene, acetonitrile, tetrahydrofuran, tetrahydropyran, 1,2-dimethoxyethane, acetone, methylethylketone, dimethylsulfoxide, dimethylformamide, pyrrolidone, and water. The solvent may be used singly, or two kinds or more thereof may be used in combination.

Also, in the hydrolysis treatment, the acid anhydride group is hydrolyzed to form a carboxyl group.

In the hydrolysis treatment, the hydrolysis may be conducted under a basic condition. In the case of a basic condition, examples of the base to be used may include at least one kind selected from the group consisting of an alkali-metal-containing compound, an alkali-metal-earth-containing compound, and a tertiary amine compound. Examples of the alkali-metal-containing compound may include an oxide, a hydroxide, a carbonate, a hydrogen carbonate, an acetate, a sulfate, and a phosphate of an alkali metal such as sodium, lithium, and potassium. Examples of the alkali-earth-metal-containing compound may include an oxide, a hydroxide, a carbonate, a hydrogen carbonate, an acetate, a sulfate, and a phosphate of an alkali earth metal such as magnesium and calcium.

The amount of use of the base is not particularly limited, but for example, may be equimolar or less relative to the acid anhydride group introduced to the modified block copolymer C2.

The reaction temperature of the base treatment and the hydrolysis treatment varies with the kind of the acid anhydride group introduced to the modified block copolymer C2 and the second base, but for example, it may be 0 to 200° C., and is preferably 10 to 150° C. If the reaction temperature is too low, the reaction speed may be slow, and if the reaction temperature is too high, there is a risk that the block copolymer C2 may be pyrolytically decomposed. Also, the reaction time varies with the reaction temperature, but for example, it may be 1 minute to 40 hours, and is preferably 3 minutes to 2 hours. If the reaction time is too short, the reaction may not sufficiently proceed, and if the reaction time is too long, there is a risk that the reaction efficiency may be inferior.

After the base treatment and the hydrolysis treatment, remaining of the second base and the base are preferably removed. Removing method may be appropriately selected depending on the kinds of the base treatment, the second base and the base, and examples of the method may include washing, neutralizing, filtrating, and drying.

(d) Fifth Step

In the fifth step, the base treatment of the modified block copolymer C3 is conducted to obtain a block copolymer B to which a functional group capable of forming a non-covalent bond as well as an ionic group is introduced.

Incidentally, the fifth step may be the same as the second step in the first embodiment.

5. Additional Component

The block copolymer composition of the present invention may contain a polyethylene wax as required. The polyethylene wax is a wax of which main constituting unit is an ethylene monomer unit. The polyethylene wax used in the present invention is not particularly limited, but preferably used is the one having a viscosity of 20 to 6,000 mPa·s at 140° C.

The polyethylene wax is generally produced by the polymerization of ethylene or the decomposition of polyethylene, and either of the polyethylene wax may be used in the present invention. Also, a commercial product of the polyethylene wax is available, and specific examples thereof may include "A-C polyethylene" (from Honeywell International Inc.), "Mitsui Hi-WAX™" (from Mitsui Chemicals, Inc.), "SANWAX" (from Sanyo Chemical, Ltd.), and "EPOLENE™" (from Westlake Chemical Corporation). Incidentally, these waxes may be ones modified (functionalized).

The block copolymer composition of the present invention may contain an antioxidant as required. There are no particular limitations on the kind thereof, and examples that can be used include hindered phenolic compounds such as pentaerythritol tetrakis[3-(3,5-di-t-butyl-4-hydroxyphenyl) propionate], octadecyl-3-(3,5-di-t-butyl-4-hydroxypenyl) propionate, 2,6-di-t-butyl-p-cresol, and di-t-butyl-4-methylphenol; thiodicarboxylate esters such as dilauryl thiopropionate; and phosphites such as tris(nonylphenyl)phosphate. One kind of the antioxidants may be used singly, or two or more kinds thereof may be used in combination.

The content of the antioxidant is not particularly limited, but per 100 parts by mass of the polymer component in the block copolymer composition, usually 10 parts by mass or less, and preferably 0.01 to 5 parts by mass.

Also, to the block copolymer composition of the present invention, if necessary, additives such as a tackifying resin, a softening agent, an antibacterial agent, a photostabilizer, an ultraviolet absorber, a dye, and a lubricant other than an aliphatic monoamide and polyethylene wax may be further added.

There are no particular limitations on the method for mixing the block copolymer with other components to obtain the block copolymer composition of the present invention. Examples thereof may include a method of dissolving the respective components in a solvent, uniformly mixing the solutions, and removing the solvent by heating or the like; and a method of melt mixing the various components with means such as a screw extruder and a kneader. From the viewpoint of performing mixing more efficiently, melt mixing is suitable among these methods. Incidentally, the temperature at the time of performing melt mixing is not particularly limited, but the temperature is usually in a range of 100 to 200° C.

6. Applications

There are no particular limitations on the applications of the block copolymer composition of the present invention and examples thereof may include a wide range of technical fields such as the medical field, the adhesive field, the electronics field, and the optics field. Examples of the applications may include an application as a material for forming goods such as a film, gloves, an elastic band, a contraceptive device, an OA equipment, various roles such as one for office usage, a vibration proof sheet for an electrical and an electronic equipment, anti-vibration rubber, a shock-absorbing sheet, a shock absorbing film and sheet, and a residential damping sheet, a damping damper material; an application as a pressure sensitive adhesive used in materials such as an adhesive tape, an adhesive sheet, an adhesive label, and a roller for collecting garbage; an application as an adhesive used in materials such as hygiene supplies and book binding; and an application as an elastic fiber used in materials such as apparel and sporting goods.

B. Film

The film of the present invention is a film comprising the block copolymer composition described above.

The above described block copolymer composition is used in the film of the present invention, and thus the film is strong and highly stretchable.

Incidentally, the block copolymer composition is described above, and thus the description herein is omitted.

1. Aromatic Vinyl Polymer

The film of the present invention may include an aromatic vinyl polymer. When the aromatic vinyl polymer is included, a film with excellent formability, strength, and high stretchability may be obtained.

The aromatic vinyl polymer used in the present invention is a polymer including a repeating unit derived from an aromatic vinyl monomer.

The content of the aromatic vinyl polymer in the film of the present invention is not particularly limited, but per 100 parts by mass of the above described block copolymer composition, it is 0 to 20 parts by mass, preferably 15 parts by mass or less, and more preferably 10 parts by mass or less.

In the present invention, usually, at leas one kind of aromatic vinyl polymers selected from below ($\alpha$) to ($\gamma$) is used.

($\alpha$) Polymer $\alpha$ of aromatic vinyl monomer
($\beta$) Aromatic vinyl—conjugated diene block copolymer $\beta$
($\gamma$) Hydrogen additive $\gamma$ of aromatic vinyl—conjugated diene block copolymer (1) Polymer $\alpha$ of Aromatic Vinyl Monomer Examples of the aromatic vinyl monomer used in the polymer $\alpha$ of aromatic vinyl monomer may include styrene; alkylstyrene such as p-, m-, or o-methylstyrene, 2,4-, 2,5-, 3,4-, or 3,5-dimethylstyrene, and p-t-butylstyrene; halogenated styrene such as o-, m-, or p-chlorostyrene, o-, m-, or p-bromostyrene, o-, m-, or p-fluorostyrene, and o-methyl-p-fluorostyrene; halogenated-substituted alkylstyrene such as o-, m-, or p-chloromethylstyrene; polyalkoxystyrene such as p-, m-, or o-methoxystyrene and o-, m-, or p-ethoxystyrene; carboxyalkylstyrene such as o-, m-, or p-carboxymethylstyrene; alkyletherstyrene such as p-vinylbenzylpropylether; alkylsilylstyrene such as p-trimethylsilylstyrene; and vinylbenzyldimethoxyphosphide. Particularly general example thereof is styrene. Not only one kind of these but two kinds or more of these may be used in combination.

The polymer $\alpha$ of aromatic vinyl monomer may be a copolymer of an aromatic vinyl monomer with a monomer copolymerizable therewith. Example of the monomer copolymerizable with the aromatic vinyl monomer may include aliphatic unsaturated carboxylic acid ester such as methyl (meth)acrylate, butyl(meth)acrylate, 2-ethylhexyl(meth) acrylate, lauryl(meth)acrylate, and stearyl(meth)acrylate.

The weight average molecular weight (Mw) of the polymer $\alpha$ of aromatic vinyl monomer is usually 50,000 or more, preferably 80,000 or more, and usually 500,000 or less, preferably 450,000 or less, and more preferably 400,000 or less. When the weight average molecular weight (Mw) of the polymer $\alpha$ of aromatic vinyl monomer is above described value or more, deterioration of the film would not occur, and thus preferable. Further, when the weight average molecular weight (Mw) of the polymer $\alpha$ of aromatic vinyl monomer is above described value or less, flow characteristics do not need adjustment, and extrudability would not be degraded; thus, is preferable.

There are no particular limitations on the melt index of the polymer $\alpha$ of aromatic vinyl monomer, but as a value measured based on ASTM D-1238 (G condition, 200° C., 5 kg), it is usually 0.1 g/10 minutes or more, preferably 1 g/10 minutes or more, and usually 40 g/10 minutes or less, preferably 35 g/10 minutes or less, and more preferably 30 g/10 minutes or less. If the melt index is the above value or more, appropriate flow viscosity would be obtained at the time of extrusion molding, and productivity would be maintained or improved. Also, if the melt index is the above value or less, appropriate cohesiveness of the resin would be obtained, and excellent film elongation strength would be obtained so that the film would not be easily embrittled.

(2) Aromatic Vinyl Monomer—Conjugated Diene Block Copolymer $\beta$

The aromatic vinyl—conjugated diene block copolymer $\beta$ is a diblock copolymer including an aromatic vinyl polymer block and a conjugated diene polymer block. The aromatic vinyl—conjugated diene block copolymer $\beta$ may be used singly, and two kinds or more of the aromatic vinyl monomer—conjugated diene block copolymer $\beta$ having different content of the aromatic vinyl monomer units may be mixed and used. Further, the aromatic vinyl—conjugated diene block copolymer $\beta$ may be the one polymerized with a copolymerizable monomer, and may be a mixture thereof. Also, it may be a mixture with the polymer $\alpha$ of aromatic vinyl monomer.

Examples of the aromatic vinyl monomer used in the aromatic vinyl—conjugated diene block copolymer $\beta$ may include those exemplified in the section "(1) Polymer $\alpha$ of aromatic vinyl monomer" described above.

Also, examples of the conjugated diene monomer used in the aromatic vinyl—conjugated diene block copolymer $\beta$ is a diolefin including a pair of conjugated double bond, and examples thereof may include 1,3-butadiene, 2-methyl-1,3-butadiene(isoprene), 2,3-dimethyl-1,3-butadiene, 1,3-pentadiene, and 1,3-hexadiene. Not only just one kind of these but two kinds or more of these may be used in combination. Among these, 1,3-butadiene, isoprene, or a mixture of the two is suitably used.

The aromatic vinyl—conjugated diene block copolymer β may be a copolymer of an aromatic vinyl monomer and a conjugated diene monomer and a monomer copolymerizable with the aromatic vinyl monomer or the conjugated diene monomer. Examples of the monomer copolymerizable with the aromatic vinyl monomer may include aliphatic unsaturated carboxylic acid ester such as methyl(meth)acrylate, butyl(meth)acrylate, 2-ethylhexyl(meth)acrylate, lauryl (meth)acrylate, and stearyl(meth)acrylate.

Examples of the aromatic vinyl—conjugated diene block copolymer β suitably used in the present invention may include a styrene—butadiene copolymer (SBR) in which the aromatic vinyl monomer is styrene and the conjugated diene monomer is butadiene. The styrene content in SBR is usually 60% by mass or more, preferably 65% by mass or more, and more preferably 70% by mass or more. Also, the styrene content is usually 95% by mass or less, preferably 90% by mass or less, and more preferably 85% by mass or less. When the styrene content is the above value or less, effect of shock resistance may be achieved, and also, when the above value or more, the elasticity of the film at a temperature around room temperature may be kept to obtain excellent resilience.

The weight average molecular weight (Mw) of the aromatic vinyl—conjugated diene block copolymer β is usually 100,000 or more, preferably 150,000 or more, and also, usually 500,000 or less, preferably 400,000 or less, and more preferably 300,000 or less. When the weight average molecular weight (Mw) of the aromatic vinyl—conjugated diene block copolymer β is the above described value or more, deterioration of the film would not occur, and thus preferable. Further, when the weight average molecular weight (Mw) of the aromatic vinyl—conjugated diene block copolymer β is above described value or less, flow characteristics do not need adjustment, and extrudability would not be degraded; thus, is preferable.

There are no particular limitations on the melt index of the aromatic vinyl—conjugated diene block copolymer but as a value measured based on ASTM D-1238 (G condition, 200° C., 5 kg), it is usually 1 g/10 minutes or more, preferably 2 g/10 minutes or more, and usually 40 g/10 minutes or less, preferably 35 g/10 minutes or less, and more preferably 30 g/10 minutes or less. If the melt index is the above value or more, appropriate flow viscosity would be obtained at the time of extrusion molding, and productivity would be maintained or improved. Also, if the melt index is the above value or less, appropriate cohesiveness of the resin would be obtained, and excellent film elongation strength would be obtained so that the film would not be easily embrittled.

Also, in the present invention, commercially available aromatic vinyl—conjugated diene block copolymer β can be used. For example, products such as "PSJ-GPPS"•"PSJ-HIPS" (from PS Japan Corporation, "Toyo Styrene GPPS"•"Toyo Styrene HIPS" (from TOYO-STYRENE CO., LTD.) and "DIC-Styrene" (from DIC Corporation) may be used.

(3) Hydrogen Additive γ of Aromatic Vinyl—Conjugated Diene Block Copolymer

In the present invention, the hydrogen additive γ of aromatic vinyl—conjugated diene block copolymer is the one in which hydrogen is added to an unsaturated double bond based on the conjugated diene monomer unit before the hydrogenation.

The content of the aromatic vinyl monomer unit relative to all the constituting units of the aromatic vinyl—conjugated diene block copolymer in the hydrogen additive γ of aromatic vinyl—conjugated diene block copolymer is preferably 60% by mass or more, more preferably 65% by mass or more, preferably 90% by mass or less, and more preferably 85% by mass or less. If the content is the above described value or more, the transparency of the film would be maintained, and also, if the content is the above described value or less, degrade in cutting resistance due to lack of extension would be inhibited, and also, from the aspect of polymer production, effects of safety of a reduction catalyst in the hydrogenation would be secured, and thus preferable.

Also, in the present invention, commercially available hydrogen additive γ of aromatic vinyl—conjugated diene block copolymer can be used. For example, products such as "Tuftec™" (from Asahi Kasei Corporation) and "SEPTON™" (from KURARAY CO., LTD.) may be used.

2. Polyolefin-Based Thermoplastic Resin

The film of the present invention may include a polyolefin-based thermoplastic resin. When the polyolefin-based thermoplastic resin is included, the film may be formed with excellent formability. Also, film production and a step of laminating with unwoven fabric can be conducted at once, and furthermore, in a case of forming a layered body by layering the film obtained by extrusion molding with the unwoven fabric or the like, the unwoven fabric or the like would not be easily peeled off therefrom.

The polyolefin-based thermoplastic resin used in the present invention is not particularly limited if it is a resin having thermal plasticity and including olefin as a main repeating unit. For example, it may be any of a homopolymer of α-olefin, a copolymer of two kinds or more of α-olefin, and a copolymer of α-olefin with a monomer other than α-olefin, and also, it may be these (co)polymers modified.

Specific examples of the polyolefin-based thermoplastic resin may include a homopolymer or a copolymer of α-olefin such as ethylene and propylene, for example, α-olefin homopolymer such as polyethylene such as linear low density polyethylene (LLDPE), low density polyethylene (LDPE), medium density polyethylene (MDPE), high density polyethylene (HDPE), and metallocene polyethylene, polypropylene, metallocene polypropylene, polymethylpentene, and polybutene; a copolymer of ethylene with other α-olefin such as an ethylene—propylene random copolymer, an ethylene—propylene block copolymer, an ethylene-butene-1 copolymer, an ethylene-prooopylene-buten-1 copolymer and an ethylene—cyclic olefin copolymer; a copolymer of α-olefin with a carboxylic unsaturated alcohol mainly composed of α-olefin, and saponified product thereof such as an ethylene—vinyl acetate copolymer, and an ethylene—vinyl alcohol copolymer; a copolymer of α-olefin with α,β-unsaturated carboxylic acid ester or α,β,-unsaturated carboxylic acid or the like mainly composed of α-olefin such as an ethylene-α,β-unsaturated carboxylic acid ester copolymer (such as an ethylene—acrylic acid ethyl copolymer and an ethylene—methacrylic acid methyl copolymer), and ethylene-α,β-unsaturated carboxylic acid copolymer (such as an ethylene—acrylic acid copolymer and an ethylene—methacrylic acid copolymer); an acid-modified olefin resin in which an α-olefin (co)polymer such as polyethylene or polypropylene is modified with an unsaturated carboxylic acid and/or anhydride thereof such as an acrylic acid, a methacrylic acid, a maleic acid, an maleic anhydride, a fumaric acid, and an itaconic acid; an ionomer resin in which Na ions, Zn ions and the like are acted on a copolymer of ethylene with a methacrylic acid; and a mixture of these. One kind of the polyolefin-based thermoplastic resin may be used singly, and two kinds or more thereof may be used in combination.

Among these, polyethylene or the copolymer of ethylene with other α-olefin is preferable, and above all, polyethylene produced using a metallocene catalyst or a copolymer of ethylene with other α-olefin is particularly preferable.

The weight average molecular weight of the polyolefin-based thermoplastic resin is not particularly limited, but usually selected in a range of 10,000 to 5,000,000, and preferably selected in a range of 50,000 to 800,000. Also, the specific gravity and the melt index of the polyolefin-based thermoplastic resin are not particularly limited, but the specific gravity is usually selected in a range of 0.80 to 0.95 g/cm$^3$, and preferably selected in a range of 0.85 to 0.94 g/cm$^3$, and the melt index is, as a value measured based on ASTM D1238 (G condition, 200° C., 5 kg), usually selected in a range of 1 to 1000 g/10 minutes, and preferably selected in a range of 3 to 500 g/10 minutes.

The content of the polyolefin-based thermoplastic resin in the film of the present invention is not particularly limited, but per 100 parts by mass of the block copolymer composition, it is 0 to 40 parts by mass, preferably 15 parts by mass or less, and more preferably 10 parts by mass or less.

3. Other Components

The film of the present invention may include a component other than the above described block copolymer composition, aromatic vinyl polymer and polyolefin-based thermoplastic resin. For example, additives such as a tackifying resin, a softening agent, an antioxidant, an antibacterial agent, a photostabilizer, an ultraviolet absorber, a dye, a lubricant, a crosslinking agent, and a crosslinking promoter may be blended as required.

4. Film

The film of the present invention is excellent in stretchability. As the stretchability of the film, for example, when it is extended to the strain of 1300%, the state is kept for 52 hours, and then release the tensile load and leave as it is for 48 hours, the recovery of the film is preferably 60% or more, more preferably 75% or more, and particularly preferably 90% or more.

The recovery of the film may be obtained from the below calculation formula in the manner a 4 mm width dog bone shaped test piece is collected from the film, the test piece is extended to 1300% with the initial strain-rate of 1.5/s using AUTOGRAPH AGS-X from Shimadzu Corporation, the state is kept for 52 hours, and then the test piece is detached from the device and left as it is for 48 hours for recovery.

Recovery (%)=(distance between grippers right after extension−distance between grippers after recovery)/(distance between grippers right after extension−distance between grippers before extension)*100

Incidentally, the distance between grippers right after extension signifies the distance between grippers when the film is extended to 1300% using AUTOGRAPH AGS-X from Shimadzu Corporation.

5. Method for Producing Film

The film of the present invention may be obtained by preparing a composition for film that includes at least the above described block copolymer composition, and forming the composition for film.

On the occasion of obtaining the composition for film, there are no particular limitations on the method for mixing the block copolymer composition, the aromatic vinyl polymer, the polyolefin-based thermoplastic resin, and various additives, and examples may include a method of dissolving each of the components in a solvent, uniformly mixing the solutions, and removing the solvent by heating or the like; and a method of heating and melting to mix the various components with a kneader or the like.

There are no particular limitations on the melt index of the composition for film overall, but as a value measured based on ASTM D-1238 (G condition, 200° C., 5 kg), it is usually 1 to 1000 g/10 minutes, preferably 3 to 700 g/10 minutes, and more preferably 5 to 500 g/10 minutes. In this range, the formability of the composition for film is particularly excellent.

There are no particular limitations on the method for forming the composition for film, and a conventionally known method for forming film may be applied. Extrusion molding is preferable since the composition for film including the above described block copolymer composition exhibits its excellent formability when extrusion molding is used in particular, and above all, extrusion molding using a T-die is particularly suitable. Specific example of extrusion molding using a T-die may include a method in which the composition for film melted at a temperature of 150 to 250° C. is extruded from a T-die installed to a uniaxial extruder or a biaxial extruder to wind the composition while cooling with a take-up roll. The film may be extended on the occasion of cooling with the take-up roll.

Also, on the occasion of obtaining the film of the present invention, a method of spray coating a base material such as an unwoven fabric with the composition for film may also be applied.

The thickness of the film of the present invention may be appropriately adjusted in accordance with applications, but when it is used as a film for sanitary goods such as a disposable diaper and a sanitary napkin, the thickness is usually 0.01 to 50 mm, preferably 0.03 to 1 mm, and more preferably 0.05 to 0.5 mm.

The film of the present invention may be used as a single layer as is, and may be used as a multilayer by layering with other component depending on applications. Specific examples of when it is used as a single layer as is may include a stretchable film used in sanitary goods such as a disposable diaper and a sanitary napkin, a protective film for protecting materials such as an optical film, and use as a thermally shrinkable film used as a shrinking package of container and a thermally shrinkable label. Specific examples of when it is used as a multilayer may include a case of forming a stretchable gathered member by slit-processing the film of the present invention and then pasting a hot-melt adhesive or the like thereto to form a tape, bonding the tape in shrunk state to an unwoven fabric, a fabric, a plastic film, or a multilayer thereof, and relaxing the shrinkage of the tape. Further, depending on other applications, the film may be appropriately processed in accordance with a conventional method and may be used as a stretchable member such as a base material for stretchable compress, gloves, surgical gloves, a finger sac, a hemostatic band, a contraceptive device, a head band, a goggles band, and a rubber band.

The present invention is not limited to the embodiments. The embodiments are exemplifications, and any other variations are intended to be included in the technical scope of the present invention if they have substantially the same constitution as the technical idea described in the claim of the present invention and offer similar operation and effect thereto.

EXAMPLES

Hereinafter, the present invention will be more specifically described by way of Examples and Comparative Examples. Incidentally, unless particularly stated otherwise, parts and percentage (%) in the various Examples are on a mass basis.

Example 1

In Example 1, as a block copolymer composition, which was a base polymer, Quintac (registered trademark) SL-189 (from ZEON CORPORATION, polystyrene-polyisoprene block copolymer composition) was used, an addition reaction to a maleic anhydride was conducted, the introduction rate of the acid anhydride group (reaction rate with the maleic anhydride) was 2.3% by mole, and then a modification treatment with amine was conducted to obtain a block copolymer composition to which functional groups (a carboxyl group and an amide group) capable of forming a non-covalent bond. Further, the carboxyl group among the functional groups capable of forming a non-covalent bond was neutralized with a sodium methoxide to form a sodium salt of carbonic acid, and thereby a block copolymer composition generating ionic interaction was prepared. Incidentally, Quintac™ SL-189 is mainly composed of polystyrene-b-polyisoprene-b-polystyrene triblock copolymer. Specific procedures are shown below.

[Chemical Formula 1]

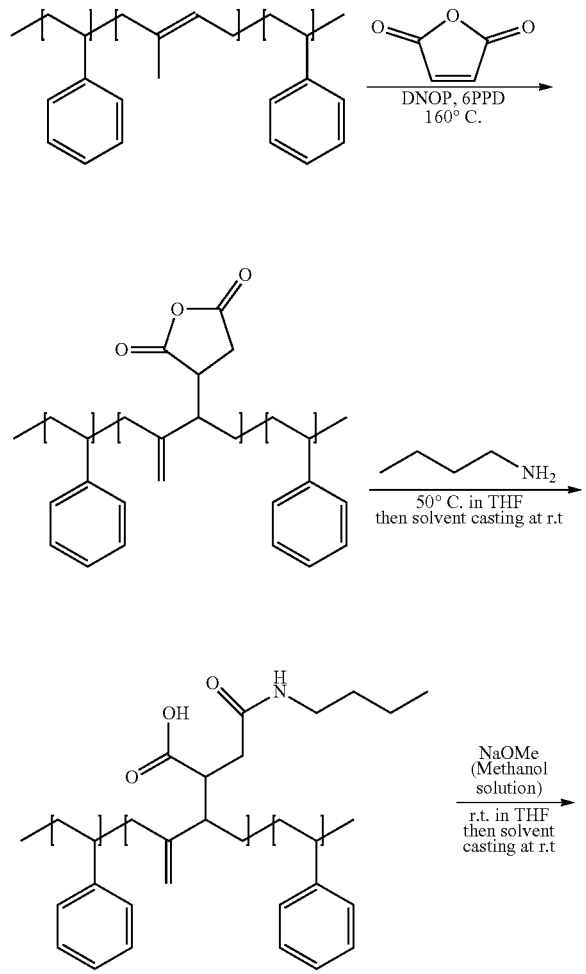

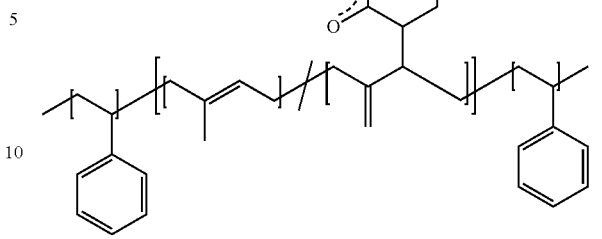

[1-1] First Step (Modification with Maleic Anhydride)

The base polymer: block copolymer (Quintac™ SL-189), an antioxidant: N-(1,3-dimethylbutyl)-N'-phenyl-1,4-phenylenediamine (hereinafter referred to as 6PPD), and the solvent: cyclohexane, were respectively weighed so as to be 5.00 g, 17.2 mg, and 25.0 g, and mixed by a magnetic stirrer in a round bottom flask for 14.5 hours at a room temperature, and thereby a solution was prepared. Di-n-octyl phthalate (hereinafter, referred to as DNOP) of 23.2 g which is a solvent with high boiling point was added to this solution and mixed, and then rotary evaporation was conducted at 70° C. for 30 minutes using a rotary evaporator in order to remove the cyclohexane in the obtained solution. Maleic anhydride of 2.5 g was added to the remaining solution, and inside the flask was replaced with nitrogen, and then the mixture was stirred at 100° C. and 100 rpm using an oil bath for about 5 minutes in a normal pressure, and thereby a reaction solution was prepared. After the maleic anhydride was completely dissolved, the flask was moved to an oil bath at about 160° C. and the mixture was stirred at 250 rpm for about 2 hours to carry out the reaction. After that, the flask was taken out from the oil bath and the reaction was terminated.

Toluene of 45 mL was added to the solution, and this solution was dropped to acetonitrile of 750 mL to precipitate a block copolymer composition modified with the maleic anhydride. The obtained polymer was separated by decantation, sufficiently dried by vacuum-drying, then dissolved in the toluene again, and dropped to the acetonitrile to precipitate a polymer. The obtained polymer was separated by decantation, and sufficiently dried by vacuum-drying. Through this process, unreacted maleic anhydride and the solvent: DNOP were removed.

Refined maleic anhydride-modified block copolymer composition was dissolved in a deuterochloroform solution so as to prepare the solution of approximately 2 mass %, and the introduction rate of the acid anhydride group derived from the maleic anhydride to the polyisoprene block in the block copolymer was determined by a proton nuclear magnetic resonance spectroscopy ($^1$H-NMR). The peak derived from the acid anhydride group derived from the maleic anhydride was observed in 2.7 to 3.4 ppm, and from the integral ratio with the peak 6.1 to 7.23 ppm derived from the phenyl group in polystyrene, the peak 4.5 to 4.85 ppm derived from poly(3,4-isoprene), and the peak 4.85 to 5.4 ppm derived from poly(1,2-isoprene), the introduction rate of the acid anhydride group derived from maleic anhydride relative to 100% by mole of the polyisoprene block in the block copolymer was estimated to be 2.3% by mole.

Also, the polymer was dissolved in tetrahydrofuran (hereinafter referred to as THF) so as to prepare the solution of approximately 0.5% by mass, and the measurement was conducted by a gel permeation chromatography (GPC). Incidentally, the measurement was conducted with THF as an effluent at the flow speed of 1 mL/min in the state three columns of TSK-GEL column 5000HHR from Tosoh Corporation were connected. It was confirmed that the cut-out in conjugated diene part scarcely occurred.

Also, the polymer was dissolved in THF so as to prepare the solution of approximately 8% by mass, 10 drops of the solution was dropped to a plate made of aluminum using a path tool pipette, the plate was placed still for 3 hours or more at a room temperature, and thereby the THF was evaporated. After that, the plate was dried using a vacuum drying machine for 3 hours or more to completely remove the solvent, and Fourier transform infrared reflection absorption spectroscopy (FT-IR) measurement was conducted for the obtained film. As a result, in the pre-maleic-anhydride-modified block copolymer composition, absorption was not confirmed in 1750 to 1900 $cm^{-1}$, but in the maleic anhydride-modified block copolymer composition, the absorption derived from the carbonyl group derived from maleic anhydride was confirmed in 1750 to 1900 $cm^{-1}$. Incidentally, used measurement device was an infrared spectrophotometer IR Prestige-21 (from Shimadzu Corporation) with an infrared microscope (AIM8800) from Shimadzu Corporation attached thereto.

[1-2] Second Step (Modification with Base)

The acid anhydride group derived from maleic anhydride in the obtained maleic anhydride-modified block copolymer composition (in which the introduction rate of the acid anhydride group derived from maleic anhydride was 2.3% by mole) was an acid anhydride having high reactivity, and thus it was presumed that it would react with monoamine compound to form a carboxyl group and an amide group (the functional group capable of forming a non-covalent bond). In a sample bottle, 500 mg of the maleic anhydride-modified block copolymer composition was dissolved in 5.00 g of THF, and 506 mg of the solution of n-butylamine including 10% by mass THF prepared in advance was further added thereto. At this time, the acid anhydride group and the n-butylamine were almost equimolar amount. Inside the sample bottle was replaced with nitrogen, and the mixture was stirred on a hot plate at 50° C. in 300 rpm for approximately 13 hours. The solution after the reaction was transferred to a Teflon (registered trademark) beaker having the capacity of 20 mL, and the beaker was placed still as it was at a room temperature for one and a half days to evaporate the THF solvent. After that, the solution was dried using a vacuum drying machine for approximately one day to completely remove the solvent. The obtained modified sample was in a film shape.

The obtained modified sample was dissolved in a deuterochloroform so as to prepare the solution of approximately 2% by mass, $^1$H-NMR method was conducted thereto, and the peak intensity derived from the proton of a methylene group adjacent to the nitrogen atom in the amide group was observed in 3.0 to 3.3 ppm; thus, it was confirmed that the amide group (the functional group capable of forming a non-covalent bond) was introduced. Also, FT-IR measurement was conducted in the same manner as that prior to the modification with amine, and the absorption derived from the N—H stretching vibrations of the amide group in 3100 to 3600 $cm^{-1}$ not observed prior to the modification with amine was newly observed.

[1-3] Third Step (Neutralization of Carboxylic Acid with Base)

The carboxyl group in the obtained modified block copolymer composition was acidic, which is considered to generate ionic interaction by adding a basic compound to form a salt and acid—base composite. In a 50 mL container made of tetrafluoroethylene perfluoroalkyl vinyl ether copolymer (hereinafter referred to as PFA), 1.00 g of the modified block copolymer composition was dissolved in 10 g of THF, and 57.7 μL of methanol solution of sodium methoxide (concentration: 5 mol/L) was added thereto using a micro pipetter (maximum capacity: 100 μL). At this time, the carboxyl group and the sodium methoxide were almost equimolar amount. The mixture was stirred for about 1 hour at a room temperature and placed still as it was at a room temperature for one and a half day to evaporate the THF solvent. After that, the mixture was dried using a vacuum drying machine for approximately one day to completely remove the solvent. The obtained modified sample generating ionic interaction was in a film shape. Per 100% by mole of the polyisoprene block in the block copolymer, the content of the ionic group (=number of carboxylate ions/(number of carboxylate ions+number of carboxyl groups)=introduction rate of acid anhydride group*molar ratio of sodium methoxide used to carboxyl group) was 2.3% by mole.

[1-4] Tensile Test

The obtained sample in a film shape was punched out with a punching blade mold, and a 4 mm width dog bone shaped test piece was prepared. The thickness of the test piece was approximately 0.51 mm. Measurement was conducted using a measurement device AGS-X, 50 N Load Cell and 50 N clip-gripper from Shimadzu Corporation, with the distance between grippers being 7.6 mm, and the initial strain-rate of 0.33/s (tension rate of 2.5 mm/s). The result of the tensile test, which is a stress—strain curve is shown in FIG. 1. The values for Young's modulus, maximum stress, breaking elongation, and area inside the stress—strain curve (index for toughness of the material) were respectively 4.4 MPa, 17.9 MPa, 2690%, and 195 MJ/$m^3$. Incidentally, the Young's modulus was determined from the initial grade (within strain of 10%) of stress—strain curve, the maximum stress was determined from the maximum value of stress, the breaking elongation was determined from elongation when fracture occurred.

[1-5] Stress Relaxation Test

Figure 2:
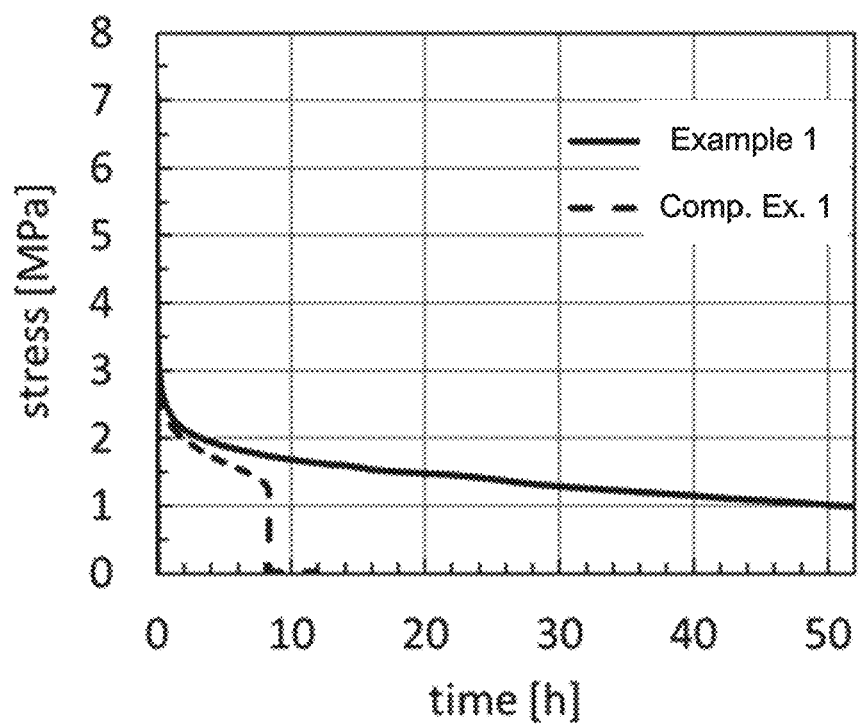
FIG. 2 is a graph showing the stress relaxation test results of Example 1 and Comparative Example 1 when distortion was 1300%.

A sample in a film shape was punched out with a punching blade mold and a 4 mm width dog bone shaped test piece was prepared in the same manner as in the tensile test. The thickness of the test piece was approximately 0.45 mm. The stress relaxation test was conducted for 52 hours in the same manner as in the tensile test using a measurement device AGS-X, 50 N Load Cell and 50 N clip-gripper from Shimadzu Corporation, with the distance between grippers being 10.0 mm, and the initial strain-rate of 1.5/s (tension rate of 15 mm/s), and strain of 1300%. The test result is shown in FIG. 2. The stress right after the strain reached at 1300% was 7.1 MPa, but after that, the stress was sharply dropped to about 3.0 MPa. The stress gradually decreased, and the stresses after 24 hours passed and 52 hours passed were respectively 1.4 MPa and 0.99 MPa. No breakage occurred.

Figure 3:
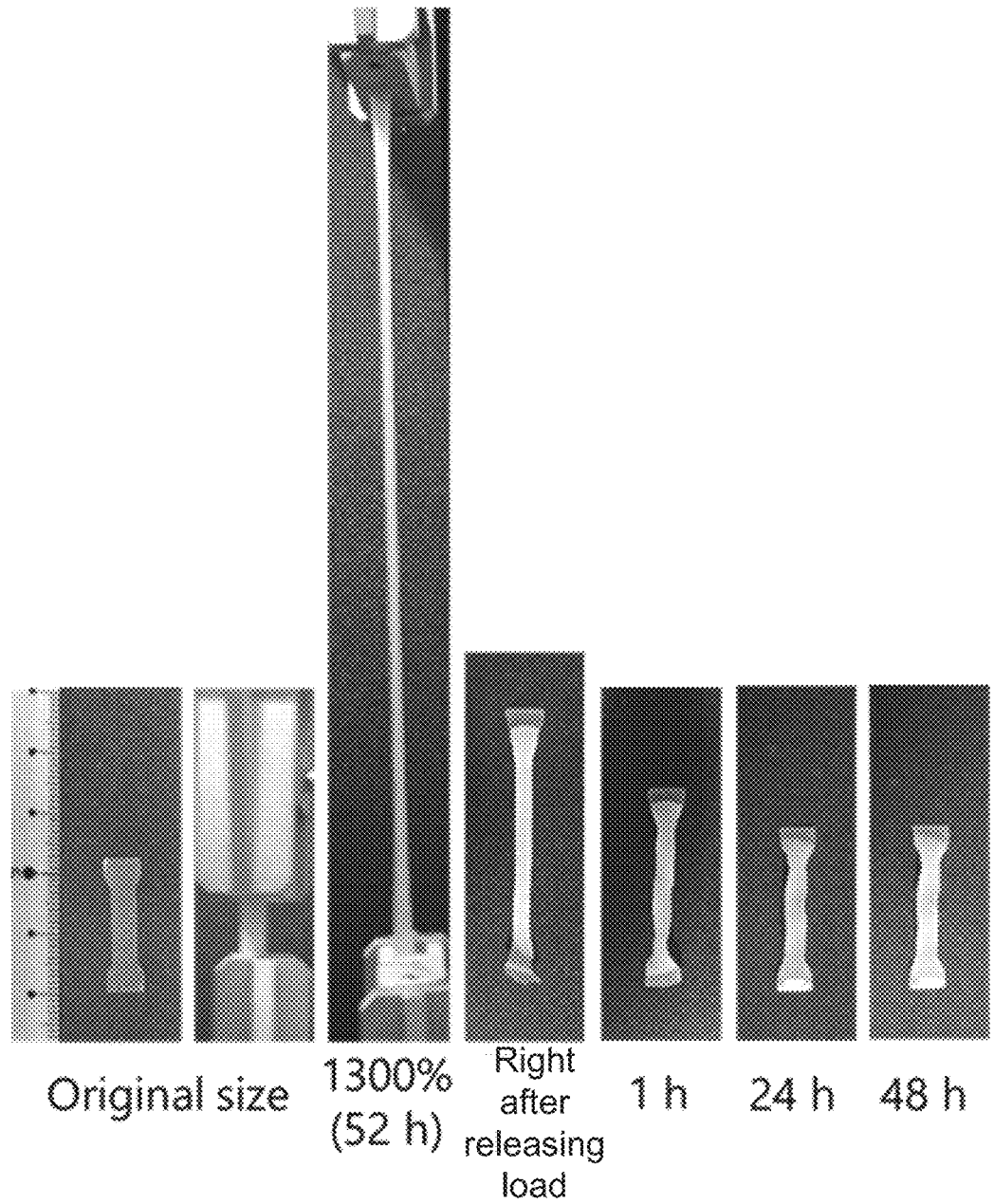
FIG. 3 is a picture of the sample in Example 1 before and after extending the sample when distortion was 1300%.

FIG. 3 shows the state of a sample after stopping applying the strain, to which the strain of 1300% was continuously applied for 52 hours. Right after stopping applying the strain, the length of the sample instantly returned to approximately 3.6 times of the distance between the grippers before extending the sample. In 1 hour, the length returned to approximately 2.4 times of the distance between the grippers before extending the sample. Further, in 24 hours, the length returned to approximately 1.7 times of the distance between the grippers before extending the sample. In 48 hours, the length returned to approximately 1.7 times of the distance between the grippers before extending the sample. It means that the recovery rate after 48 hours was 95%.

Figure 4:
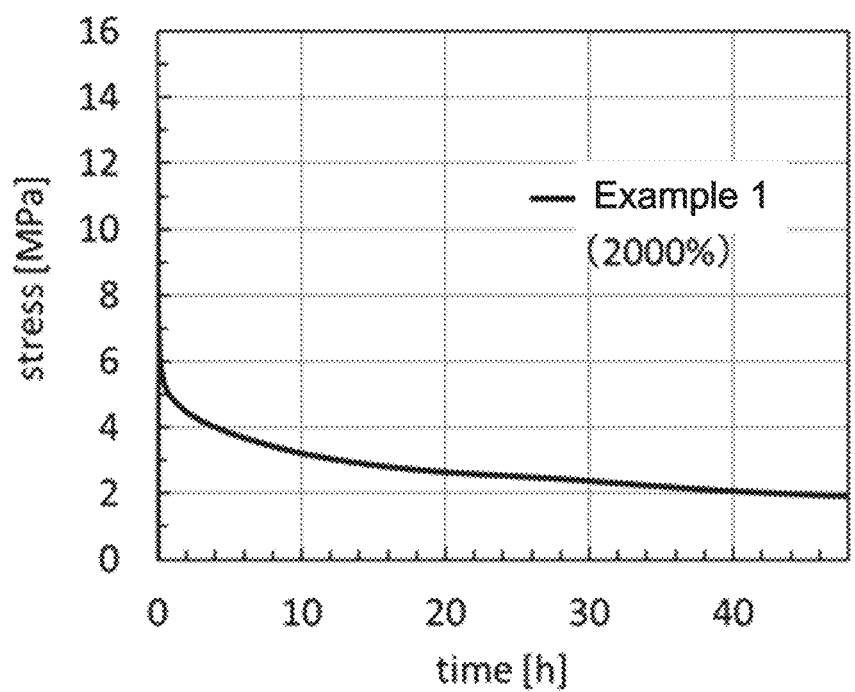
FIG. 4 is a graph showing the stress relaxation test result of Example 1 when distortion was 2000%.

Also, the obtained sample in a film shape was punched out with a punching blade mold, and a 4 mm width dog bone shaped test piece was prepared. The thickness of the test piece was approximately 0.46 mm. The stress relaxation test was conducted for 48 hours in the same manner as in the tensile test using a measurement device AGS-X, 50 N Load Cell and 50 N clip-gripper from Shimadzu Corporation, with the distance between grippers being 7.6 mm, and the initial strain-rate of 1.5/s (tension rate of 11 mm/s), and strain of 2000%. The test result is shown in FIG. 4. The stress right after the strain reached at 2000% was 13.6 MPa, but after that, the stress was sharply dropped to about 5 MPa. The stress gradually decreased, and the stresses after 24 hours passed and 48 hours passed were respectively 2.5 MPa and 1.9 MPa. No breakage occurred.

Figure 5:
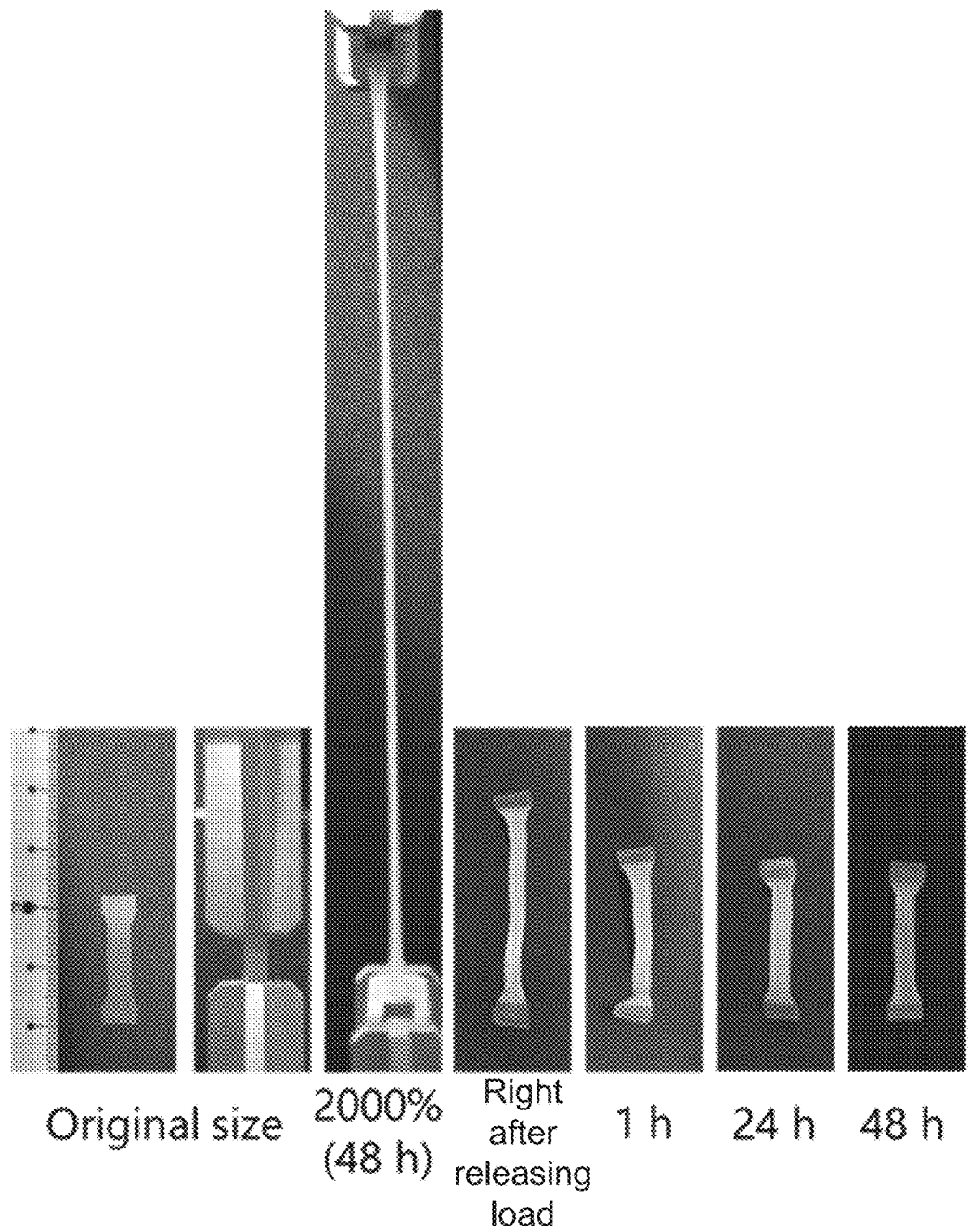
FIG. 5 is a picture of the sample in Example 1 before and after extending the sample when distortion was 2000%.

FIG. 5 shows the state of a sample after stopping applying the strain, to which the strain of 2000% was continuously applied for 48 hours. Right after stopping applying the strain, the length of the sample instantly returned to approximately 3.7 times of the distance between the grippers before extending the sample. In 1 hour, the length returned to approximately 2.7 times of the distance between the grippers before extending the sample. Further, in 24 hours, the length returned to approximately 2.2 times of the distance between the grippers before extending the sample. In 48 hours, the length returned to approximately 2.2 times of the distance between the grippers before extending the sample. It means that the recovery rate after 48 hours was 94%.

Comparative Example 1

In Comparative Example 1, a tensile test and a stress relaxation test were conducted to the block copolymer composition (Quintac™ SL-189) itself, which was used as the base polymer in Example 1.

The preparation of a film sample was conducted as follows. The block copolymer composition (Quintac™ SL-189) of 8.00 g was dissolved in THF of 80.4 g, obtained solution was transferred to a PFA container having the inner size of 128 mm by 94 mm by 23 mm, and the container was placed still as it was at a room temperature for one and a half days to evaporate the THF solvent. After that, the solution was dried using a vacuum drying machine for approximately one day to completely remove the solvent.

The obtained film sample was punched out using a punching blade mold, a 4 mm width dog bone shaped test piece (film thickness of approximately 0.99 mm) was prepared, and the tensile test was conducted with the distance between grippers being 9.5 mm, and the initial strain-rate of 0.33/s (tension rate of 3.1 mm/s). As shown in FIG. 1, Young's modulus, maximum stress, breaking elongation, and toughness were respectively 2.6 MPa, 8.9 MPa, 2030%, and 76 MJ/m$^3$.

Meanwhile, the obtained film sample was punched out using a punching blade mold, a 4 mm width dog bone shaped test piece (film thickness of approximately 0.66 mm) was prepared, and the stress relaxation test was conducted (FIG. 2) with the distance between grippers being 10.7 mm, the initial strain-rate of 1.5/s (tension rate of 16 mm/s), and the strain of 1300%. The stress right after the strain reached at 1300% was 4.3 MPa, which was lower than the stress of Example 1. It is considered that the crosslinking density on appearance increased due to ionic crosslinking after the ionic interaction occurred. After that, the stress decreased to approximately 2.5 MPa, but the degree of the decrease was smaller than that of Example 1. The stress decreased with larger decline than that of Example 1, and when 8.3 hours passed, the sample broke. It is considered that, in Example 1, stress concentration to the polystyrene domain was avoided since bonding and dissociation of non-covalent bond repeatedly occurred in a short time scale under the fixed strain; however, there was no non-covalent bond in the base polymer, and thus the stress easily applied to the polystyrene domain to pull out the polystyrene chain from the domain in the end, and thereby the breakage was caused.

Example 2

In Example 2, an addition reaction of maleic anhydride was conducted in the same manner as in Example 1, the introduction rate of the acid anhydride group (reaction rate with the maleic anhydride) was 6.1% by mole, and then a modification treatment with n-butylamine was conducted to obtain a block copolymer composition to which functional groups (carboxyl group and amide group) capable of forming a non-covalent bond were introduced. Further, a block copolymer composition generating an ionic interaction was prepared by neutralizing the carboxyl group with a sodium methoxide in the same manner as in Example 1 except that the block copolymer composition, the THF, the methanol solution of sodium methoxide (concentration: 5 mol/L) were respectively used in the amount of 1.00 g, 10.0 g, and 38.3 μL. At this time, the amount of the sodium methoxide to the carboxyl group was 28.3% by mole, and the content of the ionic group was 1.4% by mole.

Figure 6:
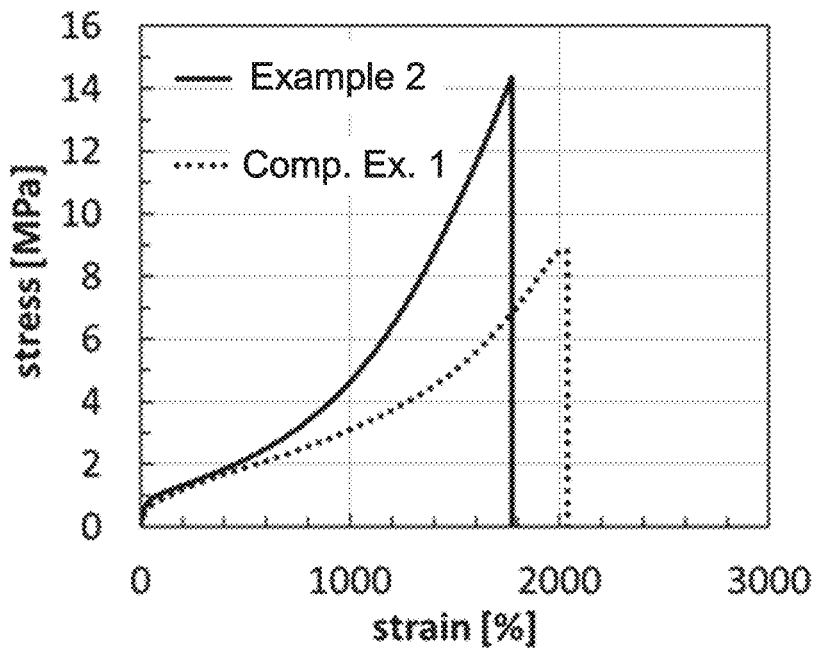
FIG. 6 is a graph showing the tensile test results of Example 2 and Comparative Example 1.

The obtained sample in a film shape was punched out with a punching blade mold, and a 4 mm width dog bone shaped test piece was prepared. The thickness of the test piece was approximately 0.51 mm. The tensile test was conducted with the distance between grippers being 10.3 mm, and the initial strain-rate of 0.33/s (tension rate of 3.4 mm/s). The test result is shown in FIG. 6. The values for Young's modulus, maximum stress, breaking elongation, and area inside the stress—strain curve was respectively 3.2 MPa, 14.4 MPa, 1770%, and 92 MJ/m$^3$.

Figure 7:
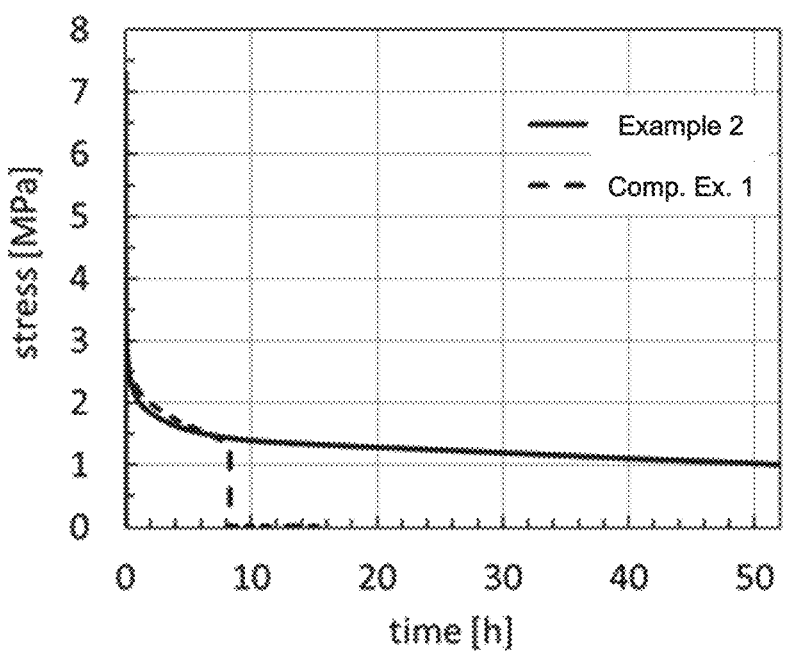
FIG. 7 is a graph showing the stress relaxation test results of Example 2 and Comparative Example 1 when distortion was 1300%.

The obtained sample in a film shape was punched out with a punching blade mold, and a 4 mm width dog bone shaped test piece was prepared. The thickness of the test piece was approximately 0.46 mm. The stress relaxation test was conducted with the distance between grippers being 8.9 mm, the initial strain-rate of 1.5/s (tension rate of 13 mm/s), and the strain of 1300% for 52 hours. The test result is shown in FIG. 7. The stress right after the strain reached at 1300% was 7.3 MPa, but the stress sharply dropped to approximately 4 MPa. The degree of decrease was larger than that of Comparative Example 1. The stress gradually decreased with more moderate decline than that of Comparative Example 1. The stresses after 24 hours passed and after 52 hours passed were respectively 1.3 MPa and 1.0 MPa. No breakage occurred.

Figure 8:
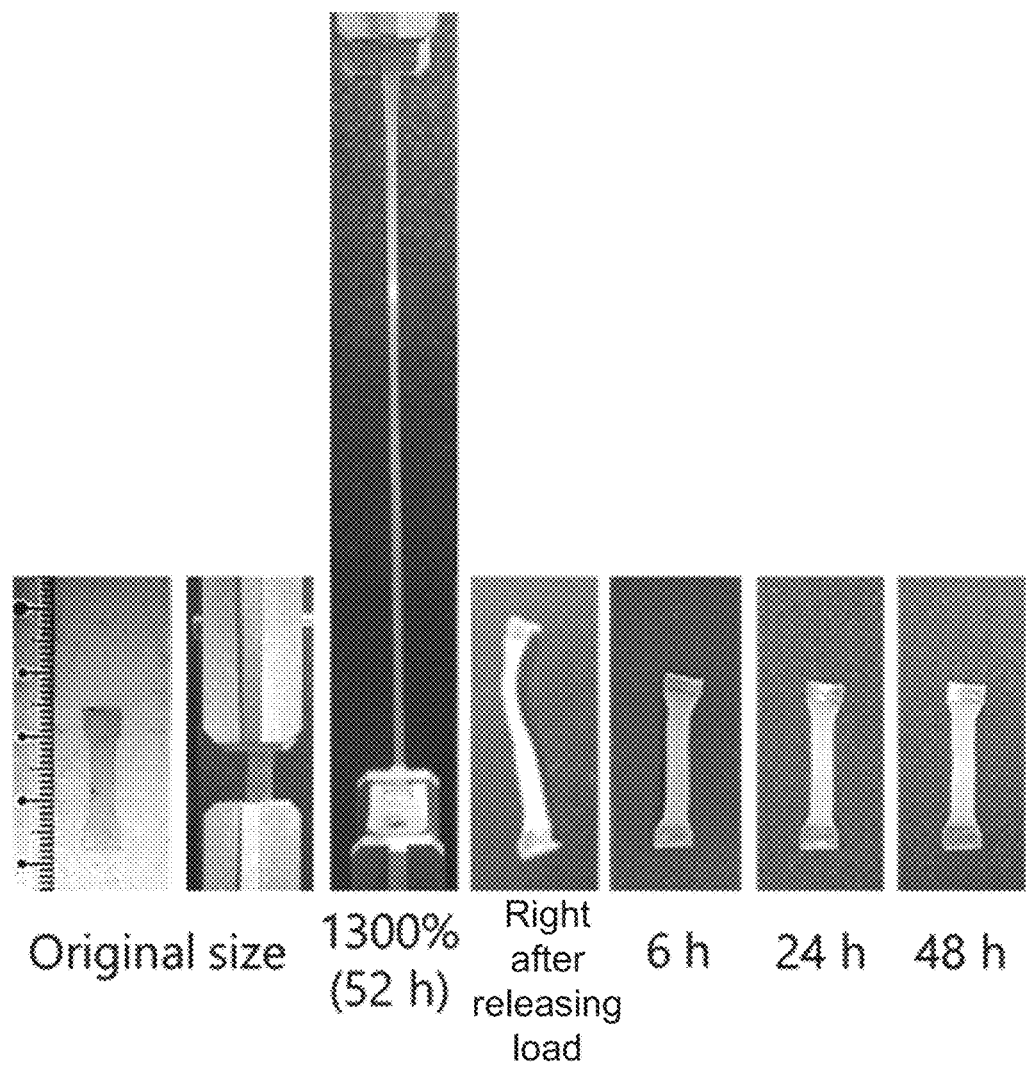
FIG. 8 is a picture of the sample in Example 2 before and after extending the sample when distortion was 1300%.

FIG. 8 shows the state of a sample after stopping applying the strain, to which the strain of 1300% was continuously applied for 52 hours. Right after stopping applying the strain, the length of the sample instantly returned to approximately 3.0 times of the distance between the grippers before extending the sample. In 6 hours, the length returned to approximately 1.9 times of the distance between the grippers before extending the sample. Further, in 24 hours, the length returned to approximately 1.7 times of the distance between the grippers before extending the sample. In 48 hours, the length returned to approximately 1.7 times of the distance between the grippers before extending the sample. It means that the recovery rate after 48 hours was 95%.

Example 3

In Example 3, an addition reaction of maleic anhydride was conducted in the same manner as in Example 1, the introduction rate of the acid anhydride group (reaction rate with the maleic anhydride) was 0.83% by mole, and then a modification treatment with n-butylamine was conducted to obtain a block copolymer composition to which functional groups (carboxyl group and amide group) capable of forming a non-covalent bond were introduced. Further, a block copolymer composition generating an ionic interaction was prepared by neutralizing the carboxyl group with a sodium methoxide in the same manner as in Example 1 except that the block copolymer composition, the THF, the methanol solution of sodium methoxide (concentration: 5 mol/L) were respectively used in the amount of 494 mg, 5.12 g, and 9.79 µL. At this time, the carboxyl group and the sodium methoxide were almost equimolar amount, and the content of the ionic group was 0.83% by mole.

Figure 9:
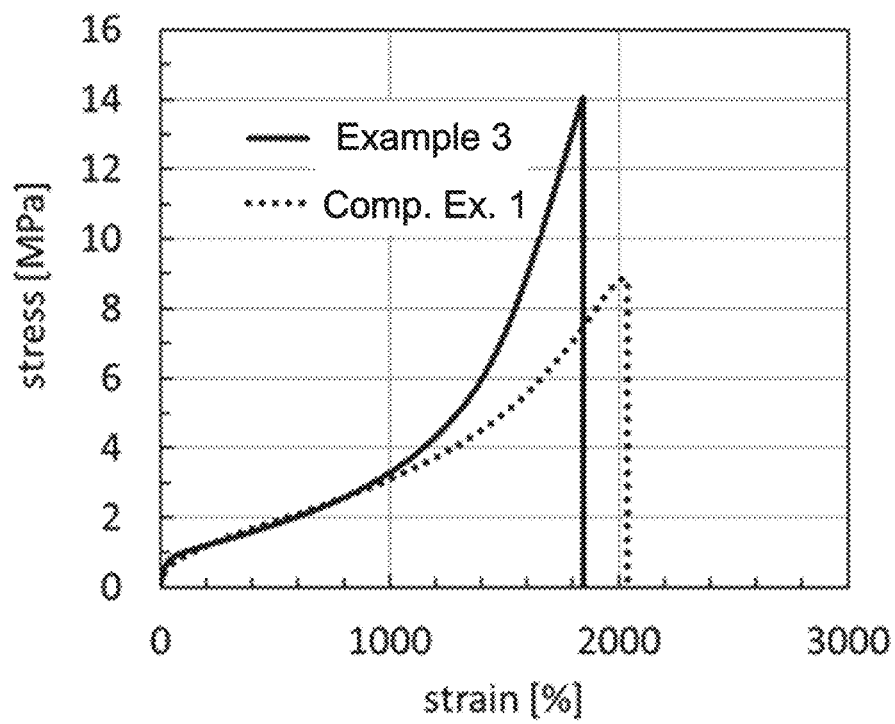
FIG. 9 is a graph showing the tensile test results of Example 3 and Comparative Example 1.

The obtained sample in a film shape was punched out with a punching blade mold, and a 4 mm width dog bone shaped test piece was prepared. The thickness of the test piece was approximately 0.54 mm. The tensile test was conducted with the distance between grippers being 10.9 mm, and the initial strain-rate of 0.33/s (tension rate of 3.6 mm/s). The test result is shown in FIG. 9. The values for Young's modulus, maximum stress, breaking elongation, and area inside the stress—strain curve was respectively 3.0 MPa, 14.0 MPa, 1840%, and 79 MJ/m$^3$.

Figure 10:
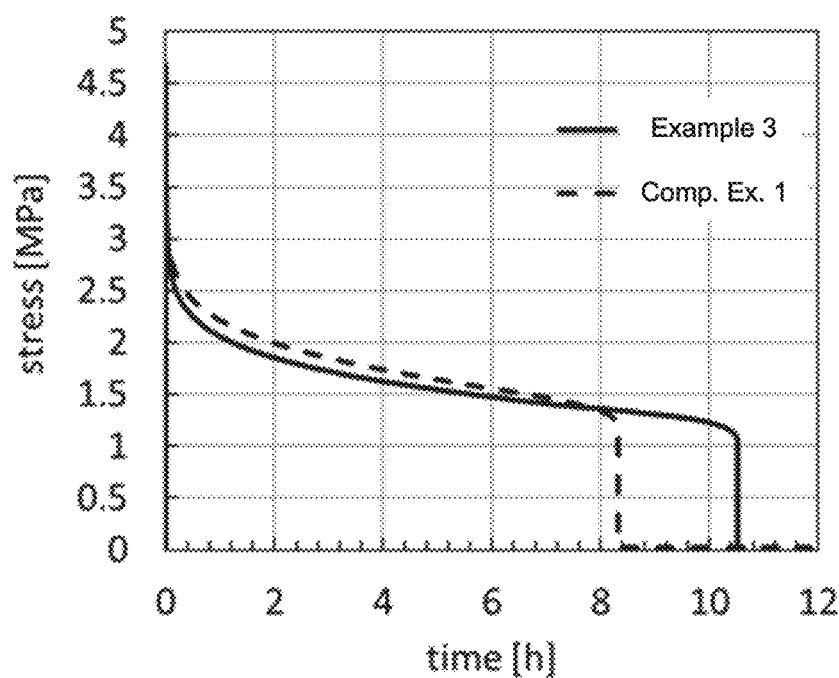
FIG. 10 is a graph showing the stress relaxation test results of Example 3 and Comparative Example 1 when distortion was 1300%.

The obtained sample in a film shape was punched out with a punching blade mold, and a 4 mm width dog bone shaped test piece was prepared. The thickness of the test piece was approximately 0.56 m. The stress relaxation test was conducted with the distance between grippers being 11 mm, the initial strain-rate of 1.5/s (tension rate of 13 mm/s), and the strain of 1300%. The test result is shown in FIG. 10. The stress right after the strain reached at 1300% was 4.7 MPa, but the stress sharply dropped to approximately 2.5 MPa. The degree of decrease was larger than that of Comparative Example 1. The stress gradually decreased with more moderate decline than that of Comparative Example 1. The stress after 10 hours passed was 1.2 MPa, and the test piece broke in 10.5 hours.

Example 4

In Example 4, an addition reaction of maleic anhydride was conducted in the same manner as in Example 1, the introduction rate of the acid anhydride group (reaction rate with the maleic anhydride) was 10.5% by mole, and then a modification treatment with n-butylamine was conducted to obtain a block copolymer composition to which functional groups (carboxyl group and amide group) capable of forming a non-covalent bond were introduced. Further, a block copolymer composition generating an ionic interaction was prepared by neutralizing the carboxyl group with a sodium methoxide in the same manner as in Example 1 except that the block copolymer composition, the THF, the methanol solution of sodium methoxide (concentration: 5 mol/L) were respectively used in the amount of 1.09 g, 10.3 g, and 252 µL. At this time, the carboxyl group and the sodium methoxide were almost equimolar amount, and the content of the ionic group was 10.5% by mole.

Figure 11:
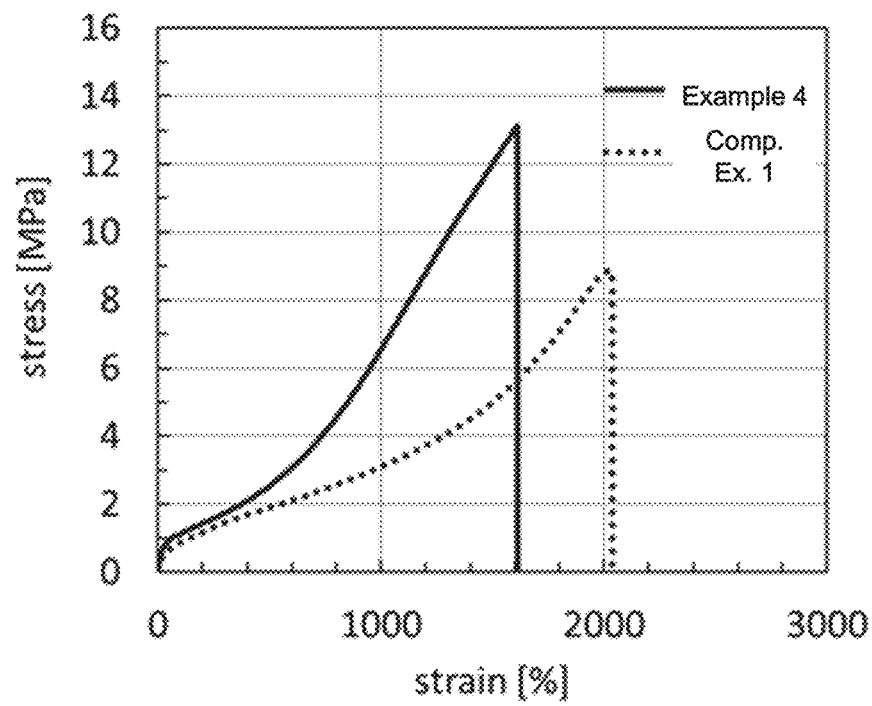
FIG. 11 is a graph showing the tensile test results of Example 4 and Comparative Example 1.

The obtained sample in a film shape was punched out with a punching blade mold, and a 4 mm width dog bone shaped test piece was prepared. The thickness of the test piece was approximately 0.55 mm. The tensile test was conducted with the distance between grippers being 8.2 mm, and the initial strain-rate of 0.33/s (tension rate of 2.7 mm/s). The test result is shown in FIG. 11. The values for Young's modulus, maximum stress, breaking elongation, and area inside the stress—strain curve was respectively 3.8 MPa, 13.1 MPa, 1610%, and 120 MJ/m$^3$.

Example 5

In Example 5, a block copolymer composition to which functional groups (carboxyl group and amide group) capable of forming a non-covalent bond was introduced was obtained in the same manner as in the first step and the second step of Example 1. The introduction rate of the acid anhydride group (reaction rate with the maleic anhydride) was 2.3% by mole which was the same as in Example 1. Further, a block copolymer composition generating an ionic interaction was prepared by neutralizing the carboxyl group with a sodium methoxide in the same manner as in Example 1 except that a lithium methoxide was used instead of the sodium methoxide, and the block copolymer composition, the THF, the methanol solution of lithium methoxide (concentration: 10% by mass) were respectively used in the amount of 1.00 g, 10.0 g, and 129 µL (0.11 g). At this time, the amount of the lithium methoxide to the carboxyl group was 100% by mole, and the content of the ionic group (=number of carboxylate ions/(number of carboxylate ions+ number of carboxyl groups)=introduction rate of acid anhydride group*molar ratio of lithium methoxide used to carboxyl group) was 2.3% by mole.

Figure 12:
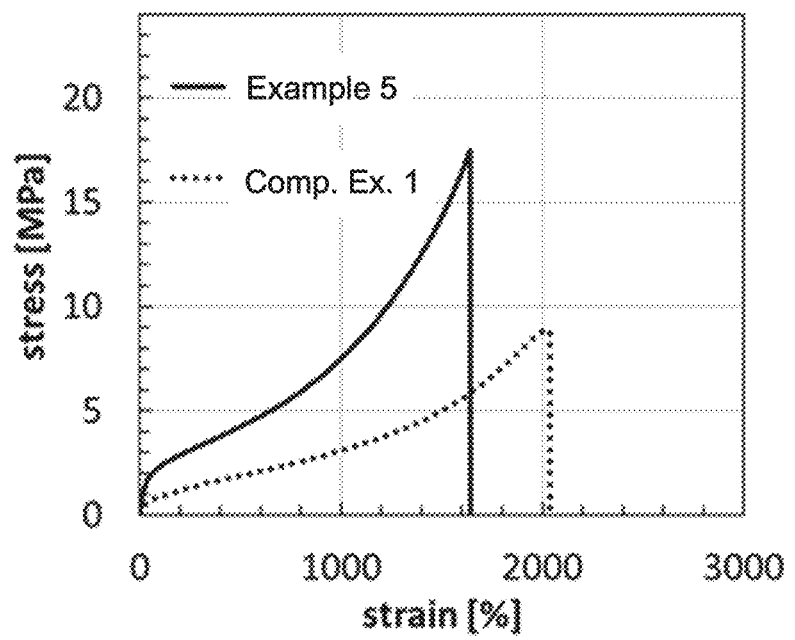
FIG. 12 is a graph showing the tensile test results of Example 5 and Comparative Example 1.

The obtained sample in a film shape was punched out with a punching blade mold, and a 4 mm width dog bone shaped test piece was prepared. The thickness of the test piece was approximately 0.35 mm. The tensile test was conducted with the distance between grippers being 10.6 mm, and the initial strain-rate of 0.33/s (tension rate of 3.5 mm/s). The test result is shown in FIG. 12. The values for Young's modulus, maximum stress, breaking elongation, and area inside the stress–strain curve was respectively 6.5 MPa, 17.5 MPa, 1640%, and 118 MJ/m$^3$.

Figure 13:
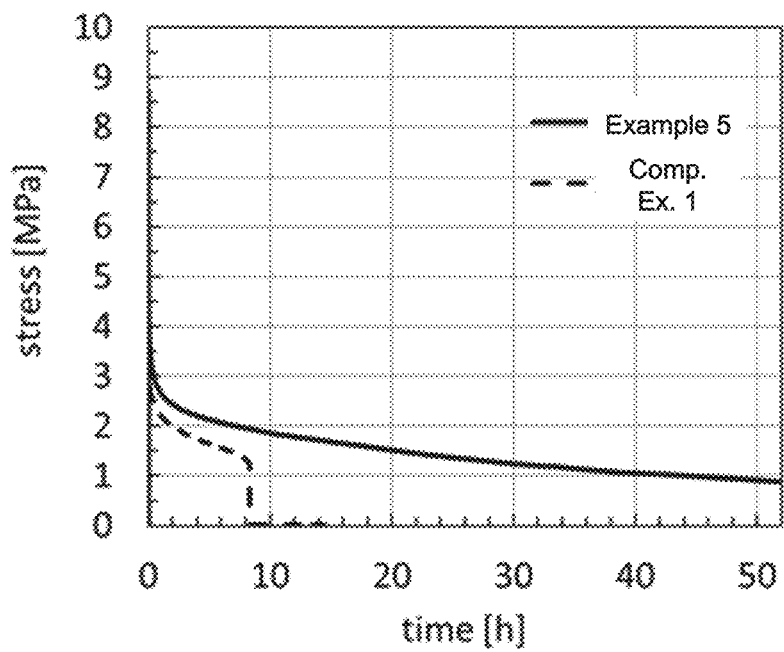
FIG. 13 is a graph showing the stress relaxation test results of Example 5 and Comparative Example 1 when distortion was 1300%.

The obtained sample in a film shape was punched out with a punching blade mold, and a 4 mm width dog bone shaped test piece was prepared. The thickness of the test piece was approximately 0.34 mm. The stress relaxation test was conducted with the distance between grippers being 10.3 mm, the initial strain-rate of 1.5/s (tension rate of 15 mm/s), and the strain of 1300% for 52 hours. The test result is shown in FIG. 13. The stress right after the strain reached at 1300% was 8.7 MPa, but the stress sharply dropped to approximately 3.5 MPa. The stress gradually decreased and the stresses after 24 hours passed and after 52 hours passed were respectively 1.4 MPa and 0.88 MPa. No breakage occurred.

Figure 14:
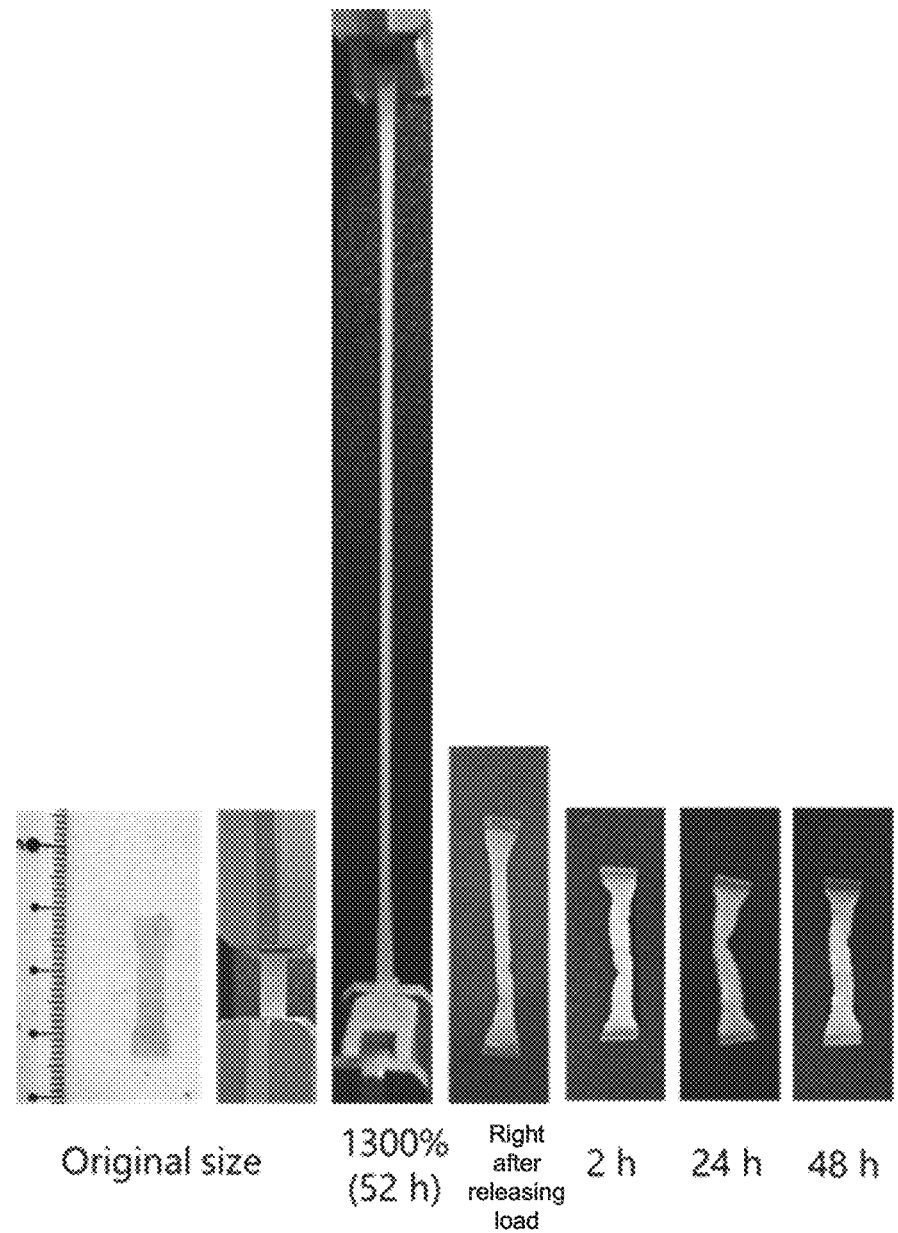
FIG. 14 is a picture of the sample in Example 5 before and after extending the sample when distortion was 1300%.

FIG. 14 shows the state of a sample after stopping applying the strain, to which the strain of 1300% was continuously applied for 52 hours. Right after stopping applying the strain, the length of the sample instantly returned to approximately 2.4 times of the distance between the grippers before extending the sample. In 1 hour, the length returned to approximately 1.9 times of the distance between the grippers before extending the sample. Further, in 24 hours, the length returned to approximately 1.8 times of the distance between the grippers before extending the sample. In 48 hours, the length returned to approximately 1.8 times of the distance between the grippers before extending the sample. It means that the recovery rate after 48 hours was 94%.

Example 6

In Example 6, a block copolymer composition to which functional groups (carboxyl group and amide group) capable of forming a non-covalent bond was introduced was obtained in the same manner as in the first step and the second step of Example 1. The introduction rate of the acid anhydride group (reaction rate with the maleic anhydride) was 2.3% by mole which was the same as in Example 1. Further, a block copolymer composition generating an ionic interaction was prepared by neutralizing the carboxyl group with a barium ethoxide in the same manner as in Example 1 except that a barium ethoxide was used instead of the sodium methoxide, and the block copolymer composition, the THF, the methanol solution of barium ethoxide (concentration: 10% by mass) were respectively used in the amount of 1.01 g, 10.0 g, and 331 µL (0.0331 g). At this time, the amount of the barium methoxide to the carboxyl group was 50% by mole, and the content of the ionic group (=number of carboxylate ions/(number of carboxylate ions+ number of carboxyl groups)=introduction rate of acid anhydride group*molar ratio of barium ethoxide used to carboxyl group*ionic valence of barium (bivalence)) was 2.3% by mole.

Figure 15:
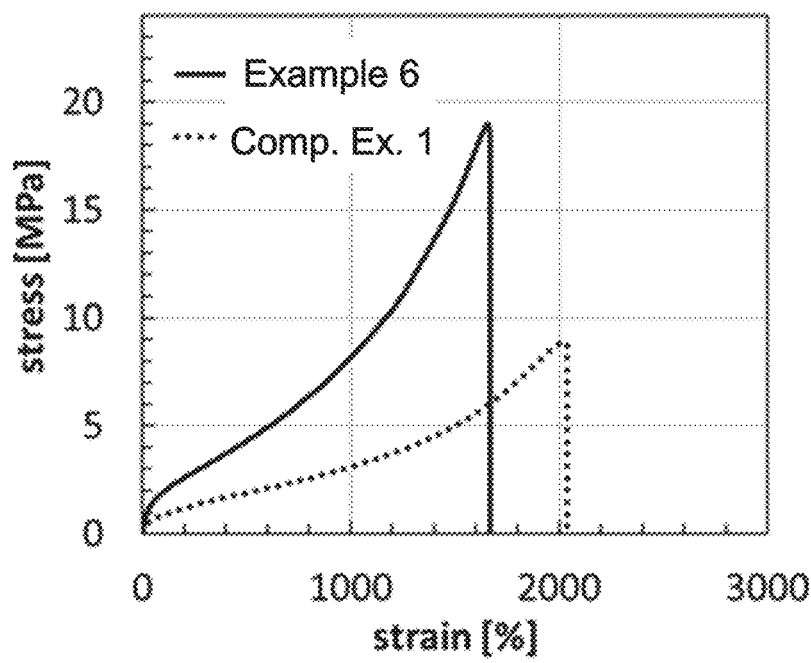
FIG. 15 is a graph showing the tensile test results of Example 6 and Comparative Example 1.

The obtained sample in a film shape was punched out with a punching blade mold, and a 4 mm width dog bone shaped test piece was prepared. The thickness of the test piece was approximately 0.32 mm. The tensile test was conducted with the distance between grippers being 10.9 mm, and the initial strain-rate of 0.33/s (tension rate of 3.6 mm/s). The test result is shown in FIG. 15. The values for Young's modulus, maximum stress, breaking elongation, and area inside the stress—strain curve was respectively 4.7 MPa, 19.0 MPa, 1660%, and 131 MJ/m$^3$.

Figure 16:
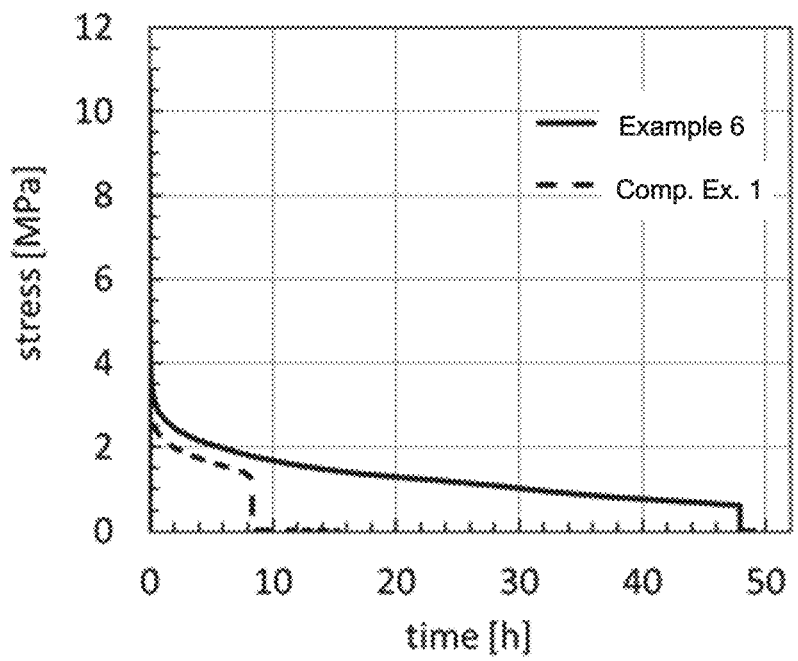
FIG. 16 is a graph showing the stress relaxation test results of Example 6 and Comparative Example 1 when distortion was 1300%.

The obtained sample in a film shape was punched out with a punching blade mold, and a 4 mm width dog bone shaped test piece was prepared. The thickness of the test piece was approximately 0.28 mm. The stress relaxation test was conducted with the distance between grippers being 10.1 mm, the initial strain-rate of 1.5/s (tension rate of 15 mm/s), and the strain of 1300%. The test result is shown in FIG. 16. The stress right after the strain reached at 1300% was 10.9 MPa, but the stress sharply dropped to approximately 3 MPa. The stress gradually decreased and the stresses after 24 hours passed was 1.2 MPa. The test piece broke in 47.9 hours.

Example 7

In Example 7, an addition reaction of maleic anhydride was conducted in the same manner as in Example 1 except that a block copolymer composition mainly composed of a polystyrene—polyisoprene diblock copolymer was used as the block copolymer composition that was the base polymer, the introduction rate of the acid anhydride group (reaction rate with the maleic anhydride) was 9.6% by mole, and then a modification treatment with n-butylamine was conducted to obtain a block copolymer composition to which functional groups (carboxyl group and amide group) capable of forming a non-covalent bond were introduced. Further, a block copolymer composition generating an ionic interaction was prepared by neutralizing the carboxyl group with a sodium methoxide in the same manner as in Example 1 except that the block copolymer composition, the THF, the methanol solution of sodium methoxide (concentration: 5 mol/L) were respectively used in the amount of 1.09 g, 11.0 g, and 237 µL. At this time, the carboxyl group and the sodium methoxide were almost equimolar amount, and the content of the ionic group was 9.6% by mole.

Figure 17:
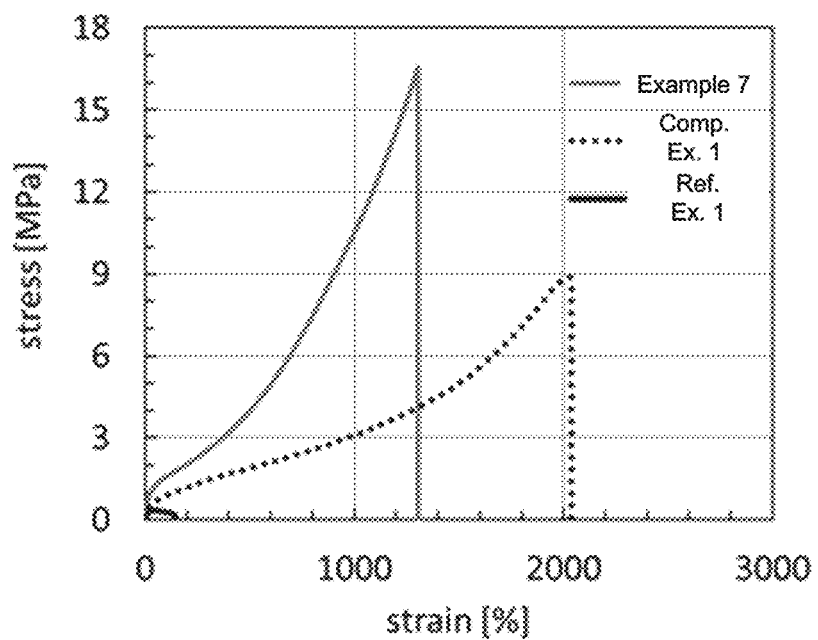
FIG. 17 is a graph showing the tensile test results of Example 7, Comparative Example 1, and Reference Example 1.

The obtained sample in a film shape was punched out with a punching blade mold, and a 4 mm width dog bone shaped test piece was prepared. The thickness of the test piece was approximately 0.52 mm. The tensile test was conducted with the distance between grippers being 10.2 mm, and the initial strain-rate of 0.33/s (tension rate of 3.4 mm/s). The test result is shown in FIG. 17. The values for Young's modulus, maximum stress, breaking elongation, and area inside the stress—strain curve was respectively 5.1 MPa, 16.6 MPa, 1300%, and 87 MJ/m$^3$. Regardless of the fact that the main component was the diblock copolymer, the test piece showed high Young's modulus, large maximum stress, and large breaking elongation.

Reference Example 1

In Reference Example 1, a tensile test and a stress relaxation test were conducted to the block copolymer composition itself, which was used as the base polymer in Example 7. The preparation of the film sample was conducted in the same manner as in Comparative Example 1 except that the base polymer and the THF were respectively used in the amount of 8.03 g and 80.9 g. The obtained sample in a film shape was punched out with a punching blade mold, and a 4 mm width dog bone shaped test piece (film thickness of approximately 0.97 mm) was prepared and the tensile test was conducted with the distance between grippers being 10.5 mm, and the initial strain-rate of 0.33/s (tension rate of 3.5 mm/s). The tensile test result is shown in FIG. 17. The values for Young's modulus, maximum stress, breaking elongation, and toughness was respectively 1.6 MPa, 0.34 MPa, 140%, and 0.40 MJ/m$^3$, which meant the test piece was hardly extended. It is considered that this occurred because the polystyrene domain generated in the formation of nano phase separation structure was not connected with a polyisoprene block since the main component was the diblock copolymer, and also, a non-covalent bond group was not generated in the polyisoprene block.

TABLE 1

| | Example 1 | Comp. Ex. 1 | Example 2 | Example 3 | Example 4 | Example 5 | Example 6 | Example 7 | Ref. Ex. 1 |
|---|---|---|---|---|---|---|---|---|---|
| Base polymer | Quintac SL-189 | Quintac SL-189 | Quintac SL-189 | Quintac SL-189 | Quintac SL-189 | Quintac SL-189 | Quintac SL-189 | SI diblock | SI diblock |
| Introduction rate of acid anhydride group (reaction rate with maleic anhydride) (% by mole) | 2.3 | — | 6.1 | 0.83 | 10.5 | 2.3 | 2.3 | 9.6 | — |

TABLE 1-continued

|  |  | Example 1 | Comp. Ex. 1 | Example 2 | Example 3 | Example 4 | Example 5 | Example 6 | Example 7 | Ref. Ex. 1 |
|---|---|---|---|---|---|---|---|---|---|---|
|  | Basic compound | NaOMe | — | NaOMe | NaOMe | NaOMe | LiOMe | Ba(OEt)$_2$ | NaOMe | — |
|  | Amount of use of basic compound to carboxyl group (% by mole) | 100 | — | 28.3 | 100 | 100 | 100 | 50 | 100 | — |
|  | Content of ionic group (% by mole) | 2.3 | — | 1.7 | 0.83 | 10.5 | 2.3 | 2.3 | 9.6 | — |
| Tensile test | Young's modulus (MPa) | 4.4 | 2.6 | 3.2 | 3.0 | 3.8 | 6.5 | 4.7 | 5.1 | 1.6 |
|  | Maximum stress (MPa) | 17.9 | 8.9 | 14.4 | 14.0 | 13.1 | 17.5 | 19.0 | 16.6 | 0.34 |
|  | Breaking elongation (%) | 2690 | 2030 | 1770 | 1840 | 1610 | 1640 | 1660 | 1300 | 140 |
|  | Area value (MJ/m$^3$) | 195 | 76 | 92 | 79 | 120 | 118 | 131 | 87 | 0.40 |
| Stress relaxation test | Strain (%) | 1300 | 2000 | 1300 | 1300 | 1300 | — | 1300 | 1300 | — |
|  | Broken time (h) | >52 | >48 | 8 | >52 | 10.5 | — | >52 | 47.9 | — |
|  | Recovery in 48 hours after releasing load (%) | 95 | 94 | — | 95 | — | — | 94 | — | — |

The invention claimed is:

1. A block copolymer composition comprising a block copolymer B formed by introducing a functional group capable of forming a non-covalent bond into a block copolymer A including at least one aromatic vinyl polymer block and at least one conjugated diene polymer block, wherein:
the functional group capable of forming a non-covalent bond comprises an ionic group,
the ionic group is, a group formed by a further reaction of, a carboxyl group formed by a reaction of an acid anhydride group introduced to the block copolymer A with a second base, with a third base,
the second base is at least one kind selected from the group consisting of ammonia and an amine compound, and
the third base is at least one kind selected from the group consisting of an alkali-metal-containing compound and an alkali-earth-metal-containing compound.

2. The block copolymer composition according to claim 1, wherein the ionic group is an ionic group produced by mixing and neutralizing an Arrhenius acid and an Arrhenius base, or/and an ionic group produced by mixing and neutralizing a Broenstead acid and a Broenstead base.

3. The block copolymer composition according to claim 1, wherein the ionic group comprises a salt of carboxylic acid.

4. The block copolymer composition according to claim 1, wherein the acid anhydride group is a group derived from an unsaturated dicarboxylic acid anhydride.

5. The block copolymer composition according to claim 1, wherein:
the functional group capable of forming a non-covalent bond further comprises a nonionic group, and
a molar ratio of the ionic group to the nonionic group in the functional group capable of forming a non-covalent bond in the block copolymer B is 0.1/100 or more.

6. The block copolymer composition according to claim 1, wherein the block copolymer B further comprises a functional group capable of forming a hydrogen bond as the functional group capable of forming a non-covalent bond.

7. The block copolymer composition according to claim 1, wherein:
a weight average molecular weight of the aromatic vinyl polymer block is in a range of 3,000 to 50,000, and
a vinyl bond content in the conjugated diene polymer block is in a range of 0.1 mol % to 50 mol % and a weight average molecular weight therein is in a range of 10,000 to 500,000.

8. The block copolymer composition according to claim 1, wherein the aromatic vinyl polymer block is polystyrene.

9. The block copolymer composition according to claim 1, wherein the conjugated diene polymer block is polybutadiene and/or polyisoprene.

10. A film comprising the block copolymer composition according to claim 1.

* * * * *